US006424967B1

(12) United States Patent
Johnson et al.

(10) Patent No.: US 6,424,967 B1
(45) Date of Patent: Jul. 23, 2002

(54) METHOD AND APPARATUS FOR QUERYING A CUBE FOREST DATA STRUCTURE

(75) Inventors: Theodore Johnson; Dennis Shasha, both of New York, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/193,521

(22) Filed: Nov. 17, 1998

(51) Int. Cl.[7] .............................................. G06F 17/30
(52) U.S. Cl. ................... 707/3; 707/2; 707/3; 707/101; 707/102
(58) Field of Search .......................... 707/2, 3, 5, 102, 707/101, 104.1, 4

(56) References Cited

U.S. PATENT DOCUMENTS

| | | | |
|---|---|---|---|
| 5,603,024 A | | 2/1997 | Goldring .................... 707/203 |
| 5,675,785 A | | 10/1997 | Hall et al. .................. 707/102 |
| 5,806,060 A | | 9/1998 | Bordiga et al. ................ 707/3 |
| 5,809,212 A | * | 9/1998 | Shasha ........................ 706/46 |
| 5,812,840 A | | 9/1998 | Shwartz ........................ 707/4 |
| 5,822,751 A | | 10/1998 | Gray et al. ..................... 707/3 |
| 5,832,475 A | * | 11/1998 | Agrawal et al. ................ 707/2 |
| 5,943,677 A | * | 8/1999 | Hicks .......................... 707/205 |
| 5,978,788 A | * | 11/1999 | Castelli et al. .................. 707/2 |
| 6,003,036 A | * | 12/1999 | Martin ........................ 707/102 |
| 6,122,628 A | * | 9/2000 | Castelli et al. .................. 707/5 |
| 6,141,655 A | * | 10/2000 | Johnson et al. ................. 707/2 |
| 6,334,125 B1 | * | 12/2001 | Johnson et al. ................. 707/3 |

OTHER PUBLICATIONS

Johnson et al., "B–Trees with Inserts and Deletes: Why Free–at–empty is Better Than Merge–at–half," IEEE, p. 1–25, Sep. 2, 1992.*

* cited by examiner

Primary Examiner—Charles R. Rones
(74) Attorney, Agent, or Firm—Kenyon & Kenyon

(57) ABSTRACT

A device and method is disclosed for using a data structure known as a cube forest for use in a batch-load-then-read-intensively system. The device and method significantly improve the time to execute a bit vector query. Hierarchically split cube forests provide a method for efficiently duplicating information, and can be optimized to reduce update and storage costs. Cube forests including hierarchically split cube forests are most appropriate for read-intensive, update-rarely-and-in-large-batches multidimensional applications in an off-the-shelf (low cost) hardware environment. A method and an apparatus for querying a cube forest for aggregates are disclosed herein.

14 Claims, 12 Drawing Sheets

FIG. 1A
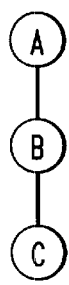
FIG. 1B
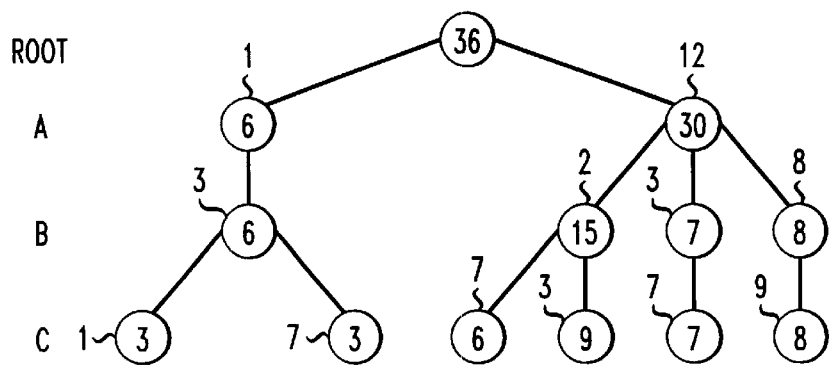
FIG. 1C
| A | B | C | V |
|---|---|---|---|
| 1 | 3 | 1 | 1 |
| 1 | 3 | 1 | 2 |
| 1 | 3 | 7 | 3 |
| 12 | 2 | 3 | 4 |
| 12 | 2 | 3 | 5 |
| 12 | 2 | 7 | 6 |
| 12 | 3 | 7 | 7 |
| 12 | 8 | 9 | 8 |

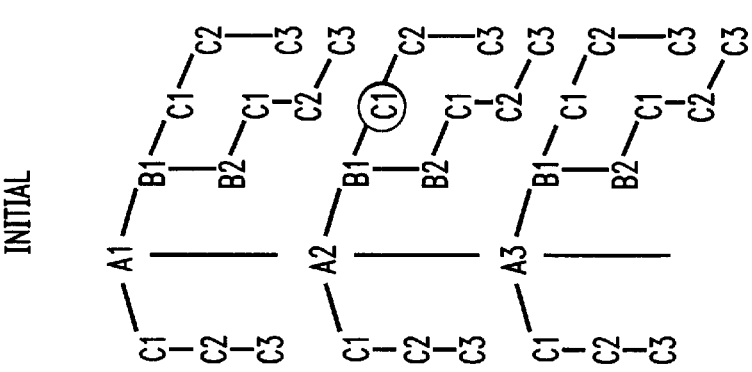
FIG. 5C PRUNE B1 (OF A3)
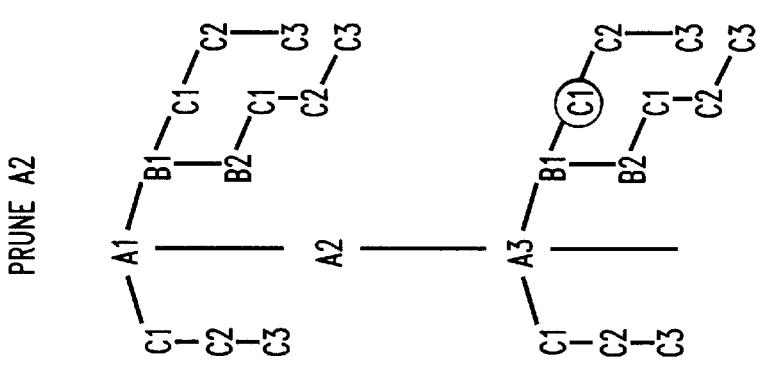
FIG. 5B PRUNE A2
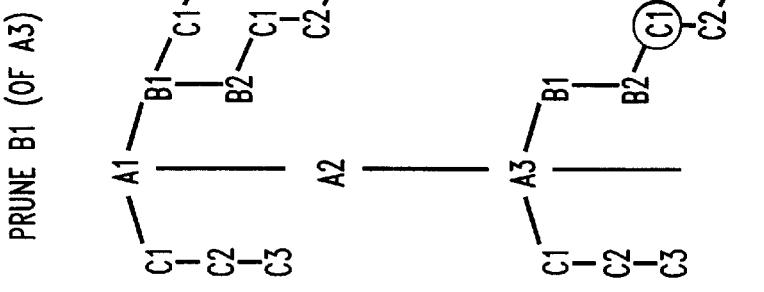
FIG. 5A INITIAL

LOCATION
|
PRODUCT

PRODUCT

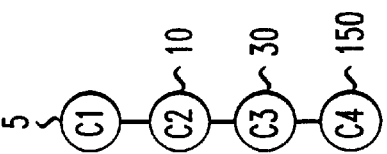
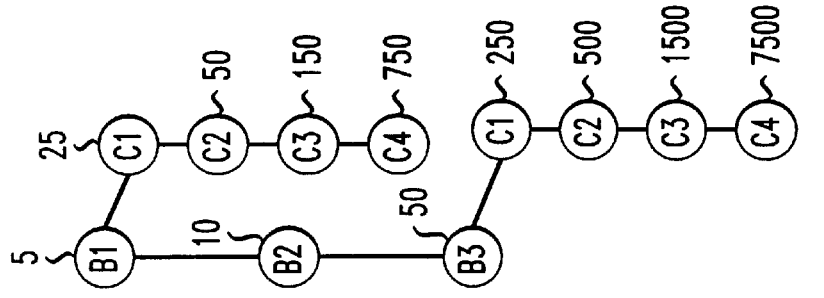
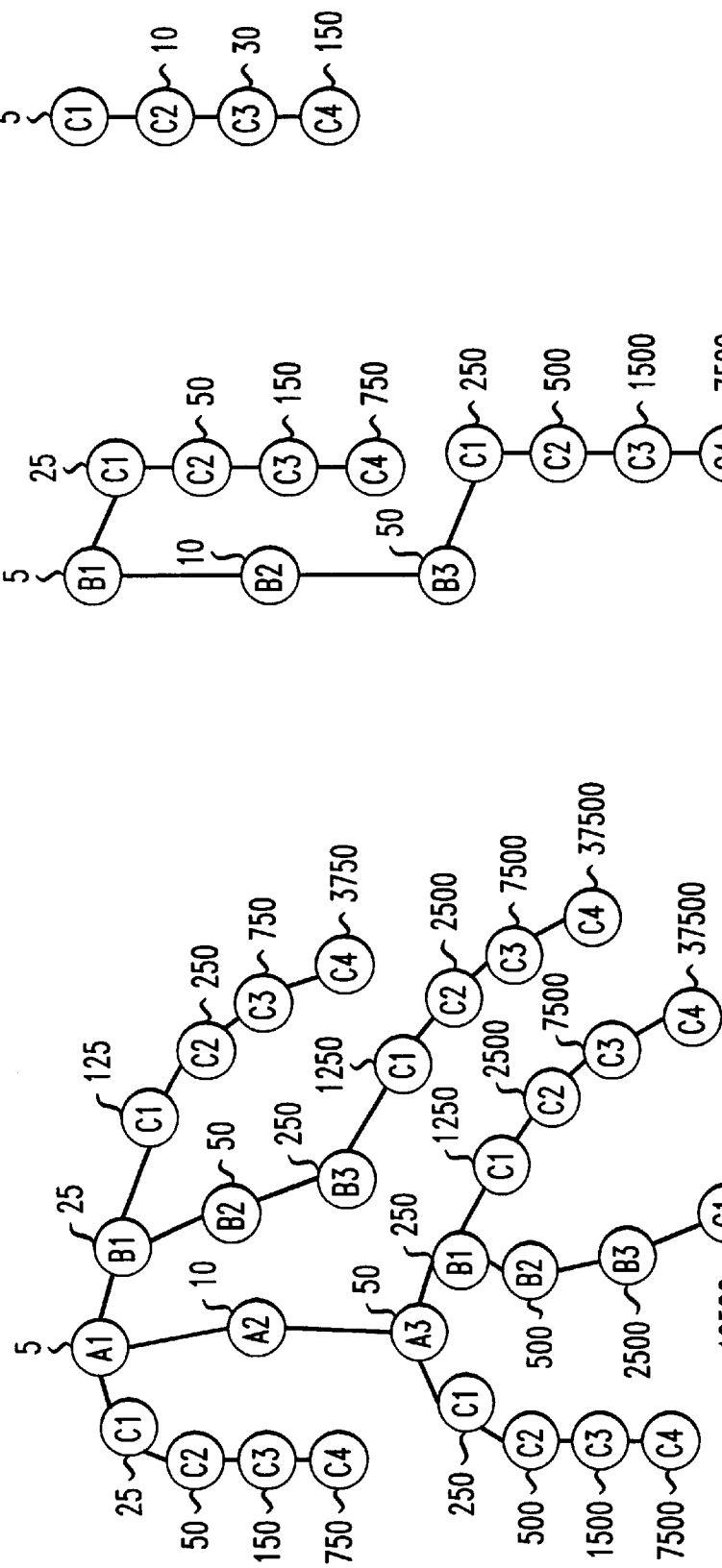

METHOD AND APPARATUS FOR QUERYING A CUBE FOREST DATA STRUCTURE

CROSS REFERENCE TO RELATED APPLICATIONS

This application is related to U.S. Pat. No. 6,334,125 issued on Dec. 25, 2001 and U.S. Pat. No. 6,141,655 issued on Oct. 31, 2000.

BACKGROUND OF THE INVENTION

The present invention relates generally to methods for querying data structures, which include aggregated data at multiple levels, and more particularly to a method for querying a cube forest data structure, which includes aggregated data at multiple levels, that enables quick searching for particular aggregates and the compact storage of this data.

High corporate and government executives must gather and present data before making decisions about the future of their enterprises. The data at their disposal is too vast to understand in its raw form, so they must consider it in summarized form, e.g., the trend of sales of a particular brand over the last few time periods. "Decision support" software to help them is often optimized for read-only complex queries.

In general, there are four main approaches to decision support:

1. Virtual memory data structures made up of two levels in which the bottom level is a one- or two-dimensional data structure, e.g., a time series array or a spreadsheet-style two dimensional matrix (time against accounts). This can be generalized so that the bottom level index can have many dimensions. These are the dense dimensions (the ones for which all possible combinations exist). The sparse dimensions are at a higher level in the form of a sparse matrix or a tree. Queries on this structure that specify values for all the sparse dimensions work quite well. Others work less optimally.

2. Bit map-based approaches in which a selection on any attribute results in a bit vector. Multiple conjunctive selections (e.g., on product, date, and location) result in multiple bit vectors which are bitwise AND'd. The resulting vector is used to select out values to be aggregated. Bit vector ideas can be extended across tables by using join indexes.

3. One company has implemented specially encoded multiway join indexes meant to support star schemas (see, e.g., their website at http://www.redbrick.com/rbs/whitepapers/star\_wp.html). These schemas have a single large table (e.g., the sales table in our running example) joined to many other tables through foreign key join (to location, time, product type and so on in our example). This technique makes heavy use of such STAR indexes to identify the rows of the atomic table (sales table) applicable to a query. Aggregates can then be calculated by retrieving the pages with the found rows and scanning them to produce the aggregates.

4. Another technique is known as materialized views for star schemas. In this technique a framework is used for choosing good aggregate views to materialize. Each aggregate view corresponds to a node in our template trees. The cost model in this technique disregards the possibility of indexes in measuring query cost. Further, this technique applies directly to current relational systems (or at least current relational systems that support materialized views). The algorithm used by this technique is a simple competitive greedy algorithm for optimizing the views to materialize (subject to the cost model), with guaranteed good properties. It goes like this: suppose that S is a set of views that might be queried. Now consider various views to materialize (including views outside S). Materialize the view that gives maximum benefit according to the author's cost model. While the author's cost model does not discuss indexes, recent work by others gives an algorithm that automatically selects the appropriate summary tables and indexes to build. The problem is NP-Complete, so heuristics are provided, which approximate the optimal solution extremely closely. This approach of a summary table and index approach as measured by space use or update time is relatively inefficient.

Yet another technique is massive parallelism on specialized processors and/or networks. Teradata® and Tandem® use this approach, making use of techniques for parallelizing the various database operators such as select,joins, and aggregates over horizontally partitioned data. Masspar, by contrast, uses a SIMD model and specialized query processing methods.

None of these techniques provides the efficiency and query aggregation speed desired by users as data size continues to grow and search engines become more and more sophisticated.

The present invention is therefore directed to the problem of developing a method for structuring data that enables the data to be stored in a storage medium in a compact form, yet permits rapid queries and aggregation of data.

SUMMARY OF THE INVENTION

The present invention solves this problem by providing a data structure known as a cube forest for use in a batch-load-then-read-intensively system. As a result of the present invention, the time to execute a bit vector query is significantly improved. Hierarchically split cube forests provide a method for efficiently duplicating information, and can be optimized to reduce update and storage costs. In summary, cube forests are most appropriate for read-intensive, update-rarely-and-in-large-batches multidimensional applications in an off-the-shelf (low cost) hardware environment.

According to the present invention, a method for structuring data with i key attributes ($A_1, \ldots, A_i$) and additional value attributes for storage in a memory includes the steps of a) defining a first forest $F_1$ as a single node labeled $A_1$; b) constructing a subsequent forest $F_n$ according to the substeps of (i) creating a node n; (ii) copying a previous forest $F_{j-1}$; (iii) making each tree in the previous forest $F_{j-1}$ a subtree of the node n; (iv) creating another copy of the previous forest $F_{j-1}$ and (v) defining the subsequent forest $F_j$ as a union of the previous forest $F_{j-1}$ and a tree rooted at the node n; and c) repeating step b) i-1 times until $F_i$ is constructed, wherein the data structure is $F_i$. According to the present invention, the i key attributes can either be orthogonal attributes or nonorthogonal attributes.

Furthermore, the above method of the present invention is particularly advantageous when the paths in $F_i$ represent keys of identifying data records.

Further, according to the present invention, an index structure for storing and indexing aggregates over at least i key attributes ($A_1, \ldots, A_i$) includes a plurality of i well-ordered trees, wherein a first tree includes one template node, and a next tree in the order includes a root template node having branches to duplicates of each of the previous trees, a total number of the template nodes is equal to $2^n-1$, $2^{n-1}$ of which are leaf nodes, and a collection of trees represents a template for building a set of search structures on a data table, and an index subkey is a catenation of attributes from a template tree root to a node.

Another aspect of the present invention includes a data storage device that includes a data structure that conforms to the rules of a full cube forest over key attributes $(A_1, \ldots, A_t)$ and a means for storing an aggregation of values at each node of the full cube forest, in which one aggregate value for each subkey is represented by the node and which appears in the data.

Yet another aspect of the present invention provides a method for structuring data comprising the steps of: a) organizing the data as a cube forest by creating a cube forest template for the data; b) creating an index on each tree within the cube forest template; c) for each template, choosing a path from a root of the template to be a spine of the tree, wherein the spine defines a composite index, and the index has a plurality of keys which are attributes of nodes in the spine concatenated together, whereby the spine partitions the h-split template, creating several subtrees; d) establishing a spine for each subtree; and e) continuing steps a) through d) until all template nodes are in some spine.

Another aspect of the present invention provides a method for designing a cube forest data structure for a given cube forest template F, which has a plurality of trees, said method comprising the steps of: a) designing an index on each tree of the plurality of trees within the cube forest template; b) choosing a longest root-to-leaf path in the particular tree path to be a spine of the particular tree given an hierarchically-split tree template; c) defining a composite index to be the spine; d) defining a plurality of keys of the composite index to be a plurality of attributes of a plurality of nodes in the spine concatenated together; e) partitioning the tree template using the spine to create a plurality of subtrees; f) determining a spine for each subtree; and g) repeating the steps a) through f) until all template nodes are in at least one spine.

The above method is particularly advantageous if it includes the steps of: h) defining an i-th subkey, denoted $sk_i$, to be a prefix comprised of $(a_1, a_2, \ldots, a_i)$ for every key $(a_1, a_2, \ldots, a_n)$ that is inserted into a tree, given an index that instantiates a spine on attributes $(A_1, A_2, \ldots, A_n)$; i) associating a set of subtree pointers with subkey $sk_i$ if a template node corresponding to $A_i$ has children other than $A_{i+1}$; j) associating an aggregate value with a particular subkey $sk_i$ if a node corresponding to $A_i$ is not aggregate pruned; k) defining an effective leaf for each subkey $sk= (a_1, \ldots, a_i)$ to be a place in the index where information associated with said each subkey is stored, wherein said information includes at least a subtree pointer and an aggregate value; l) building a spine index from a B-tree; and m) placing an effective leaf for a subkey sk at a highest level in the B-tree where the subkey sk is a subkey of a separator in a node, wherein an i-th separator in a B-tree node is a key that indicates which keys can be found in the i–1-th subtree as opposed to the i-th subkey.

In addition, the above method can include the step of placing the effective leaf at a predetermined separator position whose prefix is sk if there is more than one such separator. In this case, the predetermined separator position can either be the rightmost separator, or the leftmost separator.

According to another aspect of the present invention, a method for querying a cube forest for a single aggregate includes the steps of: a) specifying the type of query by stating how far down a hierarchy a value of an attribute is specified; and b) generating a query plan by finding a path in the cube forest template that starts at a root, and includes a node for every attribute value specified in the query.

In the above method, it is particularly advantageous if the step b) of generating the query plan by finding a path further includes selecting a shortest path if there are more than one path that starts at a root and includes a node for every attribute value specified in the query. In this case, the path found in step b) represents the query plan.

In the above method, one particularly advantageous embodiment includes the step of transforming the path into a query plan that contains detailed instructions for a generic query plan executer. In this case, this transformation includes the steps of: beginning at a top of the path and walking to an end of the path; and creating, for every node, an entry that specifies what to do at that node, including [dimension, attribute, value, and operation], wherein if the attribute value is specified in the query, the instruction is [dimension, attribute, value, single], otherwise the instruction is [dimension, attribute, *, sum].

In the above method it is particularly advantageous if the step b) of executing the query plan comprises the substeps of: (i) matching a superkey of an index with a maximal segment of the query plan, such that the maximal segment starts with a first key in the index's superkey; and (ii) summing, for each effective leaf that matches the values specified by the query plan segment, a result and returning said result, wherein if the query plan segment is a suffix of the query plan, then returning a stored aggregate, else making a recursive search.

According to yet another aspect of the present invention, a method for querying a cube forest for a group-by aggregate includes the steps of: a) specifying the type of query by stating how far down a hierarchy a value of an attribute is specified; and b) generating a query plan by finding a path in the cube forest template that starts at a root, and includes a node for every attribute value specified in the query.

It is particularly advantageous if the above method further includes the step of retrieving values for a group-by query, which can be performed by creating a query plan according to the steps for creating a query plan for a single-value retrieval, except distinguishing between "single" and group-by.

It is particularly advantageous if the above method further includes the step of upon reaching a terminal effective leaf, determining which result aggregate the answer should be added to.

According to the above method of the present invention, range queries are performed according to the same steps above, except that high and low values are attached to attribute selections, and the range of the search is extended appropriately.

According to yet another aspect of the present invention, a device for querying a cube forest for a single aggregate includes an input/output device and a processor. The input/output device specifies the type of query by stating how far down a hierarchy a value of an attribute is specified. The processor is coupled to the input/output device and generates a query plan by finding a path in the cube forest template that starts at a root, and includes a node for every attribute value specified in the query. In this case, the processor generates the query plan by finding a shortest path if there are more than one path that starts at a root and includes a node for every attribute value specified in the query, wherein the path found represents the query plan. Furthermore, the processor transforms the path into a query plan that contains detailed instructions for a generic query plan executer by: a) beginning at a top of the path and walking to an end of the path; and b) creating, for every node, an entry that specifies what to do at that node, including [dimension, attribute, value, and operation], wherein if the attribute value is specified in the query, the instruction is [dimension, attribute, value, single], otherwise the instruction is [dimension, attribute, *, sum]. In addition, the processor executes the query plan by: a) matching a superkey of an index with a maximal segment of the query plan, such that the maximal segment starts with a first key in the index's superkey; and b) summing, for each effective leaf that matches the values specified by the query plan segment, a result and returning said result, wherein if the query plan segment is a suffix of the query plan, then returning a stored aggregate, else making a recursive search.

According to another aspect of the present invention, a device for querying a cube forest for a group-by aggregate includes an input/output device specifying the type of query by stating how far down a hierarchy a value of an attribute is specified, and a processor. The processor generates a query plan by finding a path in the cube forest template that starts at a root, and includes a node for every attribute value specified in the query, by finding a shortest path, if there are more than one path that starts at a root and includes a node for every attribute value specified in the query, wherein the path found represents the query plan, and by transforming the path into a query plan that contains detailed instructions for a generic query plan executer. This is accomplished according to the steps of: (i) beginning at a top of the path and walking to an end of the path; and (ii) creating, for every node, an entry that specifies what to do at that node, including [dimension, attribute, value, and operation], wherein if the attribute value is specified in the query, the instruction is [dimension, attribute, value, single], otherwise the instruction is [dimension, attribute, *, sum]. In this case, the processor executes the query plan according to the steps of: a) matching a superkey of an index with a maximal segment of the query plan, such that the maximal segment starts with a first key in the index's superkey; b) summing, for each effective leaf that matches the values specified by the query plan segment, a result and returning said result, wherein if the query plan segment is a suffix of the query plan, then returning a stored aggregate, else making a recursive search; c) retrieving values for a group-by query by creating a query plan according to the steps for creating a query plan for a single-value retrieval, except distinguishing between "single" and group-by; and d) upon reaching a terminal effective leaf, determining which result aggregate the answer should be added to, wherein range queries are performed according to the same steps above, except that high and low values are attached to attribute selections, and the range of the search is extended appropriately.

BRIEF DESCRIPTION OF THE DRAWINGS

FIG. 1(a) depicts a linear tree template for the data of FIG. 1(a).

FIG. 1(b) depicts the instantiation of the linear tree template for data shown in the table of FIG. 1(a).

FIG. 1(c) depicts a table R, in which A, B and C represent dimensional attributes, and V represents a value attribute.

FIGS. 3(a)–(d) depict an example of a full cube forest according to the present invention for four dimensions (Z, A, B, C), in which FIGS. 3(b)–(d) depict a full cube forest for three dimensions (A, B, C), FIGS. 3(c)–(d) depict a full cube forest for two dimensions (B, C), and FIG. 3(d) depicts a full cube forest for one dimension (C).

FIGS. 5(a)–(c) depict a pruning according to the present invention of the full hierarchically split cube tree of FIGS. 4(a)–(c), in which FIG. 5(a) is the initial tree, FIG. 5(b) is the result of pruning A2, and FIG. 5(c) is the result of pruning B1 (of A3).

FIGS. 9(a)–(c) depict an hierarchically split cube forest that minimizes the batch update cost according to the present invention.

DETAILED DESCRIPTION

1 Introduction

Figure 2A:
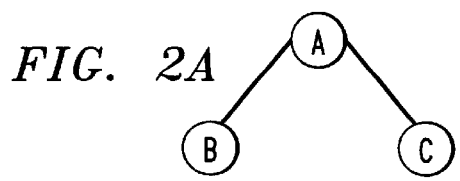
FIG. 2(a) depicts a non-linear tree template having three dimensional attributes, as in the tree template of FIG. 1(b).

The paradigmatic view of data in typical decision support applications divides the attributes (or fields) in the data records into two groups: dimensional attributes and value attributes. The dimensional attributes classify the record (such as Year, Month, Day), while the value attributes indicate a type of measured quantity (such as Sales). For example, referring to FIG. 1(c), the dimensional attributes are in columns A, B and C, while the value attributes are in column V.

The dimensional attributes can be partitioned into a set of dimensions, which are orthogonal descriptions of the record, i.e., they are independent of each other. For example, one dimension might be date (e.g., Year, Month, Date) while another dimension might be Locations (e.g., Country, State, Zip Code). Obviously, the first set is independent of (or orthogonal to) the second set.

The attributes within a dimension form hierarchies of descriptions of the record, ranging from a coarse description to a fine description. For example, the database might consist of records of retail sales collected from individual stores and brought together into a central data warehouse. This database might have three dimensions: Store Location, Product, and Time of Sale (e.g., see the table in FIG 1(c)). The value attribute might be the dollar value of the sale. A dimension might contain several attributes. For example, the Store Location dimension might consist of Country, Region, State, County, and Zip Code. These attributes form a hierarchy because knowing the value of a fine attribute (e.g., Zip Code) tells you the value of a coarse attribute (e.g., Country), but not vice versa. The attributes in the time dimension might be Year, Month, Week, Day, and Hour. This dimension has multiple hierarchies because months do not contain an integral number of weeks.

A large class of decision support queries ask for the aggregate value (sum) of one or more value attributes, where the aggregation ranges over all records whose dimensional attributes satisfy a particular selection predicate. For example, a query might be to find the sum of all sales of blue polo shirts in Palm Beach during the last quarter.

A data table that can be described in terms of dimensions and value attributes is often called a "data cube." The records in our retail sales example can be imagined to exist in a three dimensional cube, the dimensions being the Store Location, Product and Time of Sale. Queries, such as the example query above, can be thought of as corresponding to sums over regions of the data cube.

The present invention provides a file structure (i.e., the Cube Forest) for storing data in a data cube that ensures as fast a response as possible to queries. In addition, the present invention includes algorithms for: (1) loading data into a cube forest; (2) obtaining an aggregate from the cube forest in response to a query; and (3) computing an optimal cube forest structure.

We introduce a new data structure for this problem, which we call a cube forest. Like bit vectors and two-dimensional indexes, cube forests are oriented towards a batch-load-then-read-intensively system. As we will see, cube forests improve upon two level indexes for large data sets because cube forests treat all dimensions symmetrically and use standard disk-oriented indexes. Cube forests improve upon bit vectors for at least some applications because the time to execute a bit vector query is linear in the number of rows in the table. Cube queries of the kind discussed above, by contrast, can be answered using a single index search in a cube forest, regardless of selectivities. The price of fast response to queries is duplication of information. As a result, cube forests generally have higher update costs and higher storage requirements than bit vectors, but significantly faster query response times. In many applications, this is the right tradeoff. Hierarchically split cube forests provide a method for efficiently duplicating information, and can be optimized to reduce update and storage costs. In summary, cube forests are most appropriate for read-intensive, update-rarely-and-in-large-batches multidimensional applications in an off-the-shelf (low cost) hardware environment.

2 Cube Forests

In this section, we describe the mathematical notions that are prerequisite to a description of the algorithms described herein.

2.1 Preliminary Notions

To simplify the discussion, suppose our data is a single denormalized table whose attributes come from d dimensions denoting orthogonal properties (e.g., as above, product, location, time, organization, and so on). Each dimension c is organized hierarchically into $n_c$ dimensional attributes $A_{c,1}, A_{c,2}, \ldots A_{c,n_c}$, where $Ac_1$ is the most general attribute (e.g., continent) and $A_{c,n_c}$ is the most specific (e.g., school district). Thus, the denormalized relation looks like this: $R(A_{1,1}, A_{1,2}, \ldots, A_{1,n_1}, A_{2,1}, A_{2,2}, \ldots, A_{2,n_2}, \ldots, A_{d,1}, A_{d,2}, \ldots, A_{d,n_d},$ value__attributed) Here the value attributes are those to be aggregated, e.g., sale price, cost, value added, or whatever. This relation is denormalized because $A_{i,j} \rightarrow A_{i,k}$ when j>k, thus violating third normal form. (The key is $A_{1,n_1}, A_{2,n_2}, A_{d,n_d}$).

It is known to model data cubes in which each dimension may be organized as a lattice instead of as a hierarchy. For example, dates can be described by years, months and days. We might also want to organize dates by weeks. While days fit into weeks cleanly, weeks do not fit into months. Therefore, the date dimension has a second hierarchy. Throughout most of this description (especially the introductory materials), we assume that the attributes within a dimension form a hierarchy because the discussion is simpler. We discuss the extensions to the theoretical framework and the optimization algorithms to handle lattice-structured dimension. Our discussion of cube forest update and query algorithms are generalized to handle lattice structured dimensions automatically.

2.2 Assumptions

We assume initially that each dimension consists of a single attribute. Later, we will relax this assumption giving rise to the hierarchically split cube forest that constitutes the general description of our data structure. Finally, we can relax the requirement of hierarchical dimensions and permit lattice-structured dimensions. Second, we assume only a single value attribute and the only aggregate is an associative one such as sum. However, our algorithms apply unchanged when there are multiple aggregated value attributes stored in the data cube.

2.3 The Basic Structure

The instantiation of a cube tree is a search structure (e.g., B-trees or multidimensional structures) that indexes dimensional attributes and stores as data the aggregate values. A cube tree is specified by its template, which shows the (partial) order in which the attributes are indexed. Each template node represents indexing on one attribute (or a collection of attributes). Parent nodes store aggregate values over the values stored in their children.

Let us consider the simple example illustrated in FIGS. 1(a)–(c). FIG. 1(c) depicts a table R, in which A, B and C represent dimensional attributes, and V represents a value attribute. FIG. 1(a) depicts a linear cube tree template, and FIG. 1(b) depicts the instantiation of the cube tree template for data shown in the table of FIG. 1(a). In FIG. 1(b), circled numbers represent the sum of V: (i) over the entire relation (at the root, depth 0); (ii) for particular A values (depth 1); (iii) for particular AB combinations (depth 2); (iv) for particular ABC combinations (depth 3 or leaf level). Note that the instantiation is a tree even though the template is linear. Suppose that we index a table R first on A, then on B, then on C. The template for the cube tree is the list A-B-C, and we call this type of cube tree a linear cube tree. The instantiation is shown in FIG. 1(c). The quantity inside each leaf node is the sum of the V attribute for a specific A, B, C value. At the next level up the quantity inside a node is the sum of the V attribute for a specific A, B combination. At the very top, we have the sum of V over the entire relation.

We note that the index in our example is "cooked" to simplify its presentation. Since the relation is small, we can represent an attribute in the template as one level in the index. For a large relation, we need to define a strategy for implementing an index structure based on the template. For most of our discussion, we will assume that each attribute in the template corresponds to a separate index (for example, a B-tree). Our experiments with cube forest implementations have shown that a tight integration between the index structure and the cube forest algorithm is required for good performance (see Section 4). Treating each node as a separate index simplifies the discussion that leads to cube forest design and optimization algorithms. Because each node represents a class of objects that occur in the actual index structure, optimizing the template optimizes the index structure.

A tree template can be more general than a linear sequence. First, a node might contain several mutually orthogonal dimensional attributes, e.g., color and type of clothing. The index corresponding to this node is a multi-dimensional search structure over the corresponding attributes. Second, an interior node may have several children. In this case, each entry in a leaf of an index in the instantiation corresponding to the node has a pointer to a subindex for each template child of the node. This second feature leads to a tree topology for the template as shown in FIG. 2(a).

Let n be a node in a cube tree template. We define attrib(n) to be the attributes indexed by n. Next, we define pathattrib (n) to be the union of attrib(m) for every node m on the path from the root of the cube tree to node n (inclusive). The aggregates in the instantiation of n are sums over the value attributes of tuples that have particular combinations of values of the attributes in pathattrib(n). Finally, we define ancestattrib(n) to be pathattrib(m), where node m is the parent of node n in the cube tree, or $\phi$ if node n is a root. A cube tree template T is well-formed if the following two conditions hold:

1. For every node n in T, attrib(n) consists only of dimensional attributes (as opposed to value attributes such as sales).
2. For every node n in T, attrib(n) ∩ ancestattrib(n)=$\phi$.

That is, a cube tree template is well-formed if it contains neither unnecessary nor redundant attributes in any of its nodes. The definition of a well-formed cube forest template extends this definition, but requires the elimination of redundancies between trees. So, a cube forest template F is well-formed if the following two conditions hold:

1. Every cube tree template T ∈ F is well formed.
2. Let n be a node in T and m be a node in T', where T, T' ∈ F. Then pathattrib(n)=pathattrib(m) implies that n=m. If n were unequal to m in this case, the two nodes could be combined and their children combined.

Figure 2B:
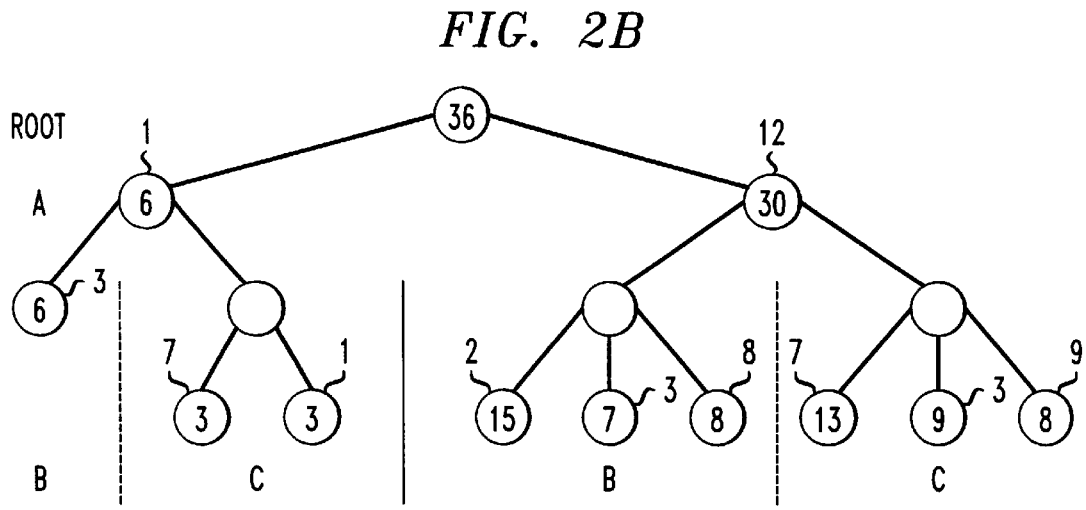
FIG. 2(b) shows a linear tree template having two dimensional attributes, as in the tree template of FIG. 1(b), but with level A removed.
Figure 2C:
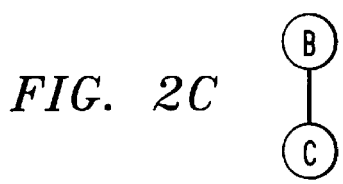
FIG. 2(c) shows the resulting instantiation of the tree template of FIG. 2(a) using the data from the table R in FIG. 1(a).
Figure 2D:
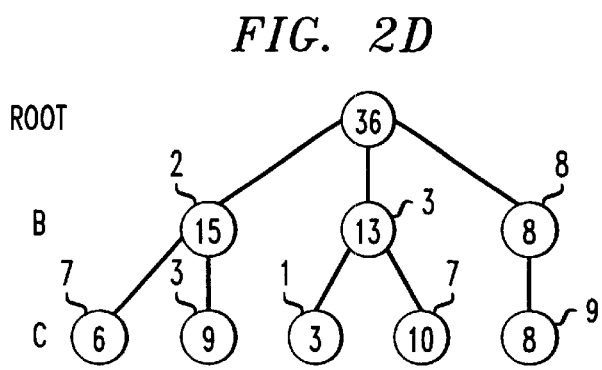
FIG. 2(d) depicts the resulting instantiation of the tree template of FIG. 2(b) using the data from the table R in FIG. 1(a).

For example, consider the cube forest shown in FIGS. 2(a) and 2(b) for the relation R of FIG. 1(a). There are two trees, one described as A-(B, C) (FIG. 2(a)) and the other (a linear tree) as B-C (FIG. 2(b)). FIGS. 2(c)–(d) depict the instantiation of the cube forest for the data from the table in FIG. 1(a) for the templates of FIGS. 2(a)–(b), respectively. The root (A) of the first tree has two children (B and C). Therefore, in the instantiation of the tree with data from R, each A value has two pointers, one to a subtree indexing, effectively, sums over the V attribute for AB combinations and one to a subtree providing sums for AC combinations. Note that B appears in both trees. But, in the first tree the path to B is A-B, while in the second tree the path is B. Since the paths are different, the forest is well-formed. This should be intuitive, since a node in the instantiation of B in the first tree corresponds to a sum over an AB pair whereas a node in the instantiation of B in the second tree is a sum over a B value.

FIGS. 2(a)–(d) depict a forest template and its instantiation. Note that each A value in the instantiation of the left template has both B children and C children.

2.4 Cost Models

Given a data cube to be indexed, there are many ways to design a cube forest. One may vary the number of cube tree templates, their shape, the assignment of attributes to nodes, and the type of search structure used at each node. Finding the best cube forest (or at least a good one) requires a performance model for evaluating design alternatives. In this section we present a generic cost model. However, the cube forest design algorithms (see Section 3) work with a wide variety of cost models. First, we have to characterize our queries.

2.4.1 Query Types

We can categorize an aggregate into one of four types based on the way it ranges over each dimensional attribute:
All: The aggregate is taken over all values of the attribute.
Point: The aggregate is taken for a specific value of the attribute.
Group-by: The aggregate is a point query for every value of the attribute.
Range: The aggregate is taken for a range of values of the attribute.

A query is categorized by the type of its access on each dimensional attribute. For example, a request for the sales of shoes in all regions, grouped by salesperson, over a range of months, can be categorized by:
(Region: All, Product: Point, Salesperson: Group-by, Date: Range).

Since there are four access types over each dimensional attribute, there are $4^n$ types of queries, where n is the number of dimensional attributes. Note, however, that if an attribute is specified in the group-by clause, then an aggregate must be computed for every unique value of the attribute. So, our first-cut analysis will consider a group-by to have been transformed to a sequence of point accesses. A more complex analysis would account for optimizations that are possible due to the iteration over the values of the attribute.

2.4.2 Query Cost

A cube forest should be able to answer all queries without resorting to scanning the aggregated relation. Define Q to be the set of all queries that will be asked of the data cube. Given a query q ∈ Q (as characterized into types above, after transforming group-by into point queries), let point(q) be all attributes of q for which a specific value is desired (shoes in the above example), range(q) be the attributes that are ranged over (e.g., date), and all(q) be the attributes over which no selection is made (e.g., regions). A cube forest F is complete with respect to q if there is a rooted path in F that contains all attributes in point(q) ∪ range(q). A cube forest is complete if it is complete with respect to q for every q ∈ Q.

Completeness ensures that a query will not have to scan the base relation. However, even complete cube forests can lead to bad query execution times. If there is an attribute that is in the rooted path but that is not in point(q) ∪ range(q), then the execution will be forced to scan the corresponding level of the cube forest. Consider for example a query of the form (B: All, A: Point, C: Point) to be executed on the linear cube tree of FIG. 1(b): every B value corresponding to the specified A value will be summed over. This observation motivates a stronger condition.

Forest F is compatible with query q if there is a rooted path P in F such that attributes(P) equals point(q) ∪ range (q). We show later that compatibility reduces the time needed to calculate a point query to a single index search.

Cost Equations. Let q be a query and P be a path used to evaluate the query. Let us assume the forest is at least complete, so point(q) ∪ range(q) ⊆ attributes(P). Let the represents increasing depth. Let $N_i$ be the number of unique key values that must be accessed to answer a point query on $A_1, A_2, \ldots, A_i$, i=1 ... k. We set $N_0$=1, because there is a single empty key. We can compute $N_i$ recursively, as follows:

1. If $A_i \in \text{point}(q)$, then $N_i=N_{i-1}$ (we only need to look up the value $A_i$).
2. If $A_i \in \text{range}(q)$, then $N_i=R*N_{i-1}$, where $R_i$ is the number of values in $A_i$ that q ranges over.
3. If $A_i \notin \text{point}(q) \cup \text{range}(q)$, then $N_i=|A_i|*N_{i-1}$. This corresponds to searching for every possible key value of $A_i$ for each of the $N_{i-1}$ values of $A_1, \ldots, A_{i-1}$. This estimate may be pessimistic, since not all $A_i$ values may be presented this deep in the cube tree and index leaves might have good clustering, but it works if the different attributes are orthogonal and the amount of underlying data is huge.

Since most of the work (particularly most of the disk accesses) occur at the maximum depth when searching for key values on $A_1, \ldots, A_k$, our analyses will concentrate on the cost to search for these keys. Let $c_i$ be the cost of searching for a single key of $A_i, \ldots A_k$. We measure cost as:

$$\text{Cost}(q,P)=c_k N_k \quad (1)$$

The cost of answering q in a cube forest F is:

$\text{Cost}(q,F)=\min\{\text{Cost}(q,P)|P \text{ is a complete path for Q in } F\}$. Finally, we define the generic cost to query the cube forest. This cost can be defined in several ways, but herein we will use the maximum cost over all queries. That is, $$\text{Cost}_{query}=\max\{\text{Cost}(q)|q \in Q\} \quad (2)$$

While this model is simplistic, we will see later that it gives a good criterion for comparison. For example, it will tell us the query cost of "pruning" our data structure when properly normalized.

Cost and Compatibility. Two observations show the importance of compatibility:

Proposition 1. In the cost model of formula (1), a path P that is compatible with q always produces the minimum value of cost(q,P).

Proposition 2. In a well-formed forest, there is at most one path P that is compatible with query q.

So, if a cube forest is compatible with every possible query, finding the best path on which to answer a query reduces to finding the compatible path. There is always one such path in a well-formed forest.

2.4.3 Update Cost

If updates are applied to the data cube with a uniform distribution of values over the dimensional attributes, then the number of leaves in the cube forest template is a good indicator of the update cost. We can expect, however, that updates are applied in correlated batches. For example, a salesman might report the sales for the past week, or a branch office might report its day's activity. In this and similar cases, many of the updates will share values for some of the attributes, such as location and date.

Suppose that B updates are done at a time, and denote the set of updates as S. Let the dimensional attributes be $A_1, A_2, \ldots, A_n$. Let $cl_i$, $0 \leq cl_i \leq 1$, be the clustering between two tuples from the batch on attribute $A_i$. We define clustering as follows: Let $t_1$ and $t_2$ be two tuples in S chosen at random and equi-probably. The probability that $t_1$ and $t_2$ have the same value of $A_i$ is $cl_i$. For purposes of analysis, we assume that the clusterings between different attributes are independent. That is, suppose that you create S' from S by selecting on attribute $A_j$. If the clustering on attribute $A_i$ is $cl_i$ for S, then the clustering on attribute $A_i$ for S' is still $cl_i$. Note that there might be no clustering between tuples in a batch on attribute $A_i$ (e.g., the colors of the socks sold by a branch store during a particular day), in which case $cl_i=1/|A_i|$. By contrast, there might be only one value of the attribute in the entire batch (e.g., the day of the store's reporting period). In this case $cl_i=1$. The definition of clustering permits in-between cases. For example, the distribution center for western Pennsylvania might cover 5 of the 15 important cities in the state.

Given B and $cl_1$, for a value a of $A_1$, there are an expected $cl_1*B$ tuples that share value a for $A_1$. The distribution is binomial, and is approximately normal. If B is large, the coefficient of variation is small. So, the number of unique values of $A_1$ is $B/(cl_1*B)=1/cl_1$. Note that this is independent of B. If $1/cl_1 \approx B$, then the formula breaks down, but a good approximation is $\min(B, 1/cl_1)$.

Let us now try to analyze the update cost of any path $A_1-A_2-\ldots-A_n$ in a cube tree. Let $L_i$ be the number of unique keys drawn from B and projected onto $(A_1, \ldots, A_i)$. From the above discussion, $L_1=\min(B, 1/c_1)$. Since clusterings are independent, for each value of $A_1$, there are min $(B/L_1, 1/cl_2)$ values of $A_2$ in S. Summing over all $L_1$ values of $A_1$, we obtain $L_2=\min(B, L1/cl_2)$. In general, $L_{\{i+1\}}=\min(B, L/cl_{(i+1)})$. The cost of updating a path of the tree is dominated by the cost at the leaves, so we model the cost as $\text{Cost}_{update}=L_n$.

For example, let B=10,000, $cl_1=0.1$, $cl_2=0.05$, $cl_3=0.1$, and $cl_4=0.125$. Then, $L_1=10$, $L_2=200$, $L_3=2,000$, $L_4=10,000$, and UC=10,000.

2.4.4 Sorting Costs

Whereas this model captures I/O costs, it assumes that all the updates to a sum over V associated with a particular combination of dimensional attribute values are applied together. Achieving this requires clustering based on the dimensional attribute values, achieved by sorting. The batch update algorithm we describe in Section 5 uses an in-memory sort. Performance can be further improved by a preliminary sort of the data before the batch update begins.

In summary, we model the update cost in nearly the same way as we modeled query cost: as proportional to the number of leaves updated plus the sorting cost. This simple model proves to be quite accurate in predicting preferable designs, even when the sorting cost is left out.

2.5 Full Cube Forests

We would like to be able to construct a well-formed cube forest in which any point query can be answered by searching for a single node. That is, the structure should be compatible with every point query. We can construct such a full cube forest $F_H$ on H attributes, $A_1, \ldots, A_H$ recursively:

1. $F_1$ consists of a single node n labeled $A_1$.
2. To construct $F_i$,
    (a) Create a node n labeled $A_i$.
    (b) Create a copy of $F_{(i-1)}$. Make each tree in $F_{(i-1)}$ a subtree of n.
    (c) Create another copy of $F_{(i-1)}$. $F_i$ is the union of $F_{(i-1)}$ and the tree rooted at n.

An example of a full cube forest is shown in FIGS. 3(a)–(d). We call dimension $A_1$ (attribute A in FIG. 3(a)) the leaf dimension and we call dimension $A_H$ (attribute Z) the root dimension. An analysis of the size of the combinatorial structure shows that:

Theorem 1 The full cube forest $F_n$
1. contains $2^{n-1}$ template nodes, $2^{n-1}$ of which are leaves.
2. is compatible with any query on its n dimensional attributes.

Proof: Part 1 follows by solving the recurrence implicit in the construction: $F_n$ consists of two instances of the template tree of $F_{(n-1)}$ plus one new node.

Part 2 requires an inductive argument. The inductive claim is that some rooted path in $F_i$ is compatible with any query over $A_1, \ldots, A_i$. Base case: i=1. The path consisting of $A_1$. Inductive case: We assume that the claim is true for $i \leq k$ Consider a query q over some subset of $A_1, \ldots, A_{k+1}$. If q does not specify a point or range constraint over $A_{k+1}$, some rooted path in $F_k$ is compatible with q by the inductive hypothesis and the fact that $F_k$ is a subforest of $F_{k+1}$ by construction step c. Suppose that q does specify a point or range constraint on $A_{k+1}$. Let $B_1, \ldots, B_p$ be the other attributes specified by q (where $\{B_1, \ldots, B_p\}$ is a subset of $\{A_1, \ldots, A_{k+1}\}$). By inductive hypothesis, some rooted path P in $F_k$ is compatible with $B_1, \ldots, B_p$. By construction, there is a rooted path P' in $F_{k+1}$ having $A_{k+1}$ as the root and P as the other members of P'. So, P' is compatible with q.

Figure 3A:
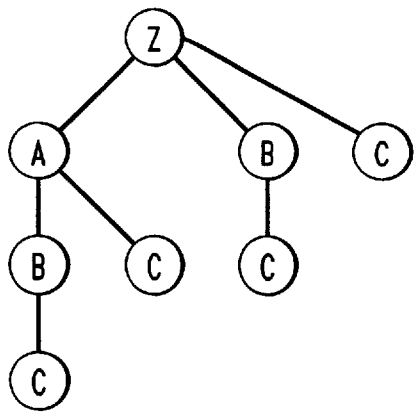
Figure 3B:
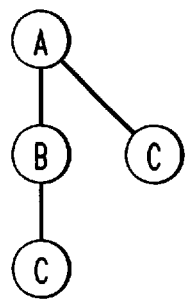
Figure 3C:
Figure 3D:

FIGS. 3(a)–(d) depict a full cube forest on the four attributes Z, A, B, C. Note that the trees in FIGS. 3(b)–(d) represent a full cube forest on A, B, and C, the trees in FIGS. 3(c)–(d) represent a full cube forest on B and C, and the tree in FIG. 3(c) represents a full cube forest on C. Thus, these full cube forests represent the cube forests for one, two, three and four dimensions of attributes. Higher levels of dimensional cube forests can be constructed from these cube forests.

2.6 Hierarchically Split Cube Forests

From now on, we allow a dimension to contain multiple attributes. Initially, we assume that these attributes are related in a hierarchical (or, if you prefer, a one-to-many fashion). For example, the date dimension can be specified by year, month, or day with a one-to-many relationship from year to month and month to day. The attributes in a single dimension are said to be co-dimensional. The template for a hierarchically split cube forest on dimensions $D_1, \ldots, D_n$ is a full cube forest on $D_1, \ldots, D_n$. (We call this full cube forest made up only of dimensions a dimensional cube forest.)

Each dimension $D_i$ consists of attributes $a_{i,1}, \ldots, a_{i,k_i}$ where $a_i$ is coarsest (e.g., year) and $a_{i,k_i}$ is finest (e.g., day). So, $a_{i,k+1}$ is the child of and functionally determines $a_{k,i}$. Each $a_{i,j}$ has as children a full copy of the h-split forests corresponding to the forests of which $D_i$ is the ancestor in the dimensional cube forest; and if $j<k_i$, a co-dimensional child $a_{i,j+1}$.

Figure 4A:
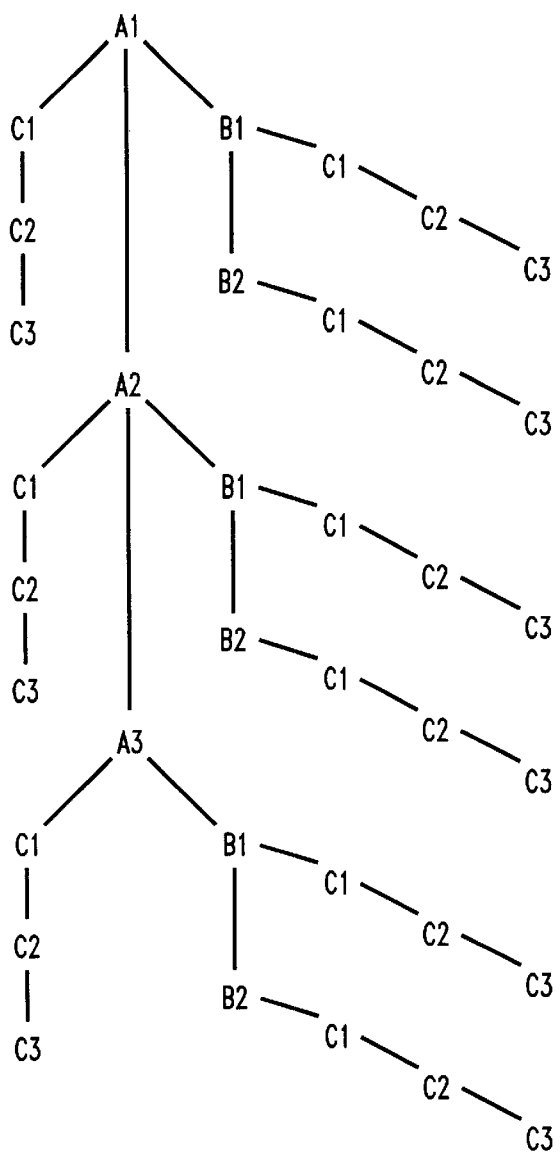
FIGS. 4(a)–(c) depict a template for a hierarchically split cube forest on three dimensions (A, B, C) according to the present invention.
Figure 4B:
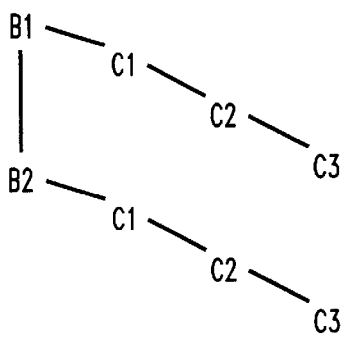
Figure 4C:
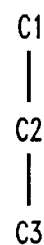

A full h-split forest (our abbreviation for hierarchically split cube forest) on three dimensions is shown in FIGS. 4(a)–(c). Dimensions A and C (the root and leaf dimensions) each have three attributes, and B has two attributes. The three trees in FIGS. 3(b)–(d) constitute the underlying full dimensional cube forest of FIGS. 4(a)–(c).

In FIG. 4(a), the tree for dimension B and the tree for dimension C are attached to each of the attributes of dimension A (i.e., A1, A2, A3). This is called splitting a dimension. This may seem to be inefficient, but the full h-split forest template has far fewer nodes than a full cube forest that treats all attributes as orthogonal. Recall that a full cube forest on k attributes contains $2^k$ nodes in the template. Suppose that the h-split forest contains H dimensions, each of which contains $A_i$ attributes, i=1, …, H. Let $N_i$ be the number of nodes in the h-split forest template for i dimensions. Then, Theorem 2. Including a node that gives the total value of the aggregate over all data instances, $$N_H = \prod_{i=1}^{H}(A_i + 1).$$

The number of leaf nodes in the template is $$\prod_{i=2}^{H}(A_i + 1).$$

Consider the example in FIGS. 4(a)–(c). The h-split forest has 48 nodes, 12 of which are leaves. A full cube forest on the same set of attributes would have 255 nodes, 128 of which would be leaves. Since the bulk of the storage and update cost is in the leaves, the h-split forest will be much less expensive to maintain than the full cube forest.

FIGS. 4(a)–(c) depict a template for a hierarchically split cube forest on three dimensions (A, B, and C).

How good is a full hierarchically split cube forest? Consider the style of queries we discussed at the beginning. Ostensibly, a full h-split forest is not compatible with most queries, since any query referencing $a_{i,j}$ must also reference $a_{i,k}$ for $1 \leq k < j$. This does not force a scan, however, because $a_{i,j}$ has a many-to-one relationship with all such $a_{i,k}$, as opposed to being an orthogonal attribute (the interpretation of $a_{i,j}$ might be ambiguous without specifying $a_{i,k}$ (e.g., several states might have a county with the same name)). Therefore, referencing $a_{i,j}$ also references $a_{i,1}$ through $a_{i,j-1}$.

We formalize this intuition as follows. A point cube query is a cube query restricted to the form: ($A_1$: point, $A_2$: point, …, $A_n$: point, $D_1$: all, $D_2$: all, …, $D_k$: all) such that $A_i$ is in a different dimension from $A_j$ when i and j are different. Also, neither $A_i$ nor $A_j$ is in dimension $D_m$ for $1 \leq m \leq k$. In other words, either no attribute in a dimension D is specified or exactly one attribute in D has a point constraint. Let point-attribute(q) be the set of attributes referenced by the query (the $A_i$) and let point-dimension (q) be the set of dimensions specified by the $A_i$.

A rooted path P through an h-split forest is hierarchically compatible with a point cube query q if the following holds: (i) P touches every attribute A in point-attribute(q) but touches no co-dimensional child of A; and (ii) P touches no attributes from dimensions outside point-dimension(q).

To gain intuition about hierarchical compatibility, consider the point cube query ($A_2$: point, $C_1$: point, B:all) on the forest in FIGS. 4(a)–(c). Suppose for concreteness, the query specifies $A_2$ to be 313 and $C_1$ to be 1711. A search descends the instantiation of the leftmost template tree of the figure until the search reaches a node n containing the $A_2$ value of 313. The search continues down the C subtree of n until it reaches the node m in the instantiation of template node $C_1$ containing 1711. Node m contains, therefore, the aggregate, say sum of V, where $A_2$=313 and $C_1$=1711.

Theorem. If F is a full hierarchically split cube forest then (i) every point-range cube query q over any subset of the dimensions in F is hierarchically compatible with some rooted path in F; and (ii) every point cube query over any subset of the dimensions in F can be answered at a single node in F.

Proof:

(i) By construction and theorem 1, there are rooted paths involving only the dimensions in point-range-dimension(q). Let us say those dimensions are $D_{i1}, \ldots, D_{ij}$ at the root and let the point-range attributes be $A_{i1}, \ldots, A_{ij}$. By the construction of the full h-split forest, there is a path from the root to $A_{i1}$, (via a split) to the root of $D_{i2}$, to $A_{i2}$, so on to $A_{ij}$.

(ii) By (i), every point cube query q is hierarchically compatible with a rooted path in F. Since q is a point query, it requires only a single combination of its point attributes. By construction of cube forests, those are at a single node in the instantiation.

Thus, full hierarchically split cube forests can answer a point cube query q in a single descent of a data structure.

2.6.1 Pruned Hierarchically Split Cube Forests

We can reduce the number of template nodes (and the attendant storage and update costs) still further, if we are willing to increase the query costs. To bound this increase, we exploit the fact that many of the attributes summarize only a few values from the attribute immediately lower in the hierarchy—there are only 12 months in a year and only a few states in a region. It might be acceptable to drop all aggregates summed over a year. The reason is that we can compute a per-year aggregate by summing twelve per-month aggregates. We call this operation pruning.

In this section, we discuss three types of pruning. Pruning subtrees from a node representing attribute $A_{i,j}$ means eliminating all children of $A_{i,j}$ (and subtrees rooted at those children) other than its co-dimensional child $A_{i,j+1}$. Pruning aggregates from $A_{i,j}$ means that we do not store the aggregate associated with $A_{i,j}$. Finally, pruning a dimension at a node representing attribute $A_{i,j}$ means that we decide to not store indices rooted by dimensions 1 through i−1. A pruned H-split forest is an h-split forest which has had zero or more pruning operations performed on it.

We can prune subtrees from $A_{i,j}$ only if it has co-dimensional children, because otherwise there would be an unrecoverable loss of information (one can calculate the sum of sales over years from the sum of sales over months if years are pruned but not vice versa). Similarly, we can prune aggregates from $A_{i,j}$ only if $A_{i,j}$ has a descendent whose aggregates are not pruned.

Pruning Subtrees. Pruning subtrees from a node high in a tree eliminates many template nodes, because all descendant trees will be pruned. However, the cost imposed on the worst case queries multiplies whenever two pruned attributes are related by ancestor-descendant relationships within the same dimension or come from different dimensions. For example, if we prune months alone, then each year calculation is slowed down by a factor of 12 compared to an unpruned h-split forest; if we prune month and state, however, and we want sales from a specific month and state, then the calculation is slowed down by a factor of 12 times the number of counties per state.

FIGS. 5(a)–(c) show an example of a pruning. In FIG. 5(a), we start with the full tree from FIG. 4(a). We prune node $A_2$ by deleting its non-co-dimensional subtrees, i.e., subtrees $C_1$-$C_2$-$C_3$ and $B_1$-$B_2$ both having branches to $C_1$-$C_2$-$C_3$. Also, we prune the node $B_1$ that is a child of $A_3$. $B_1$'s non-co-dimensional subtree are deleted.

FIGS. 5(a)–(c) depict a pruning of the full h-split tree of the previous figure. The above example shows that pruning an h-split forest decreases the update cost at the cost of increasing the query cost of some queries. In particular, consider a point query on $(A_2, B_1, C_1)$. In the initial tree, only one key lookup is required. After node $A_2$ is pruned, we need to look up every $(A_1, A_2, A_3, B_1, C_1)$ key that matches the given values of $A_1, A_2, B_1,$ and $C_1$. The number of keys we need to look up is increased by $|A_3|$. Similarly, after the $C_1$ child of $A_1$-$A_2$-$A_3$-$B_1$ is pruned, the search cost increases by $|B_2|$.

Pruning aggregates. Pruning aggregates can be performed at any node $A_{i,j}$ that has had its subtrees pruned. This pruning does not increase the maximum query cost because pruning aggregates at $A_{i,j}$ multiplies the cost of answering a query targeted at $A_{i,j}$, while pruning subtrees multiplies the cost of answering queries targeted at non co-dimensional descendants of $A_{i,j}$. For dimensions 1 through H−1, if we prune aggregates at $A_{i,j}$ then pruning subtrees at $A_{i,j}$ is free. So one can assume that at dimensions 2 through H. subtrees and aggregates are pruned together.

At dimension 1 (the leaf dimension) we can prune aggregates, but there are no subtrees to prune. In the example of FIGS. 5(a)–(c), we can prune aggregates from the circled $C_1$ nodes. In this case, the query must sum aggregates from the $C_2$ child.

Pruning Dimensions. In addition to pruning branches from a tree, we can also eliminate entire trees from the cube forest. For example, suppose there are only 2 possible values of $B_1$ in the cube forest shown in FIGS. 4(a)–(c). Then, we might not need to store the tree rooted by $C_1$, since any query that is compatible with the tree rooted by $C_1$ can be answered at twice the cost through the forest rooted at $B_1$. When we eliminate the tree rooted at $C_1$, we say that we are pruning dimensions at node $B_1$.

We can further observe that we can use dimension-pruned subforests when we build a cube tree. For example, consider the children of the $A_1$ node in FIG. 4(a). The subtrees rooted by $B_1$ and $C_1$ are equivalent to the forest consisting of the trees rooted by $B_1$ and $C_1$. If we can prune a dimension at the tree rooted by $B_1$, we might also be able to prune a dimension at the subtree rooted by $B_1$. In this case, we would delete the subtree rooted by $C_1$ and leave the subtree rooted by $B_1$.

Optimization. We cannot allow the search cost to become too large (i.e., more than a few seconds), because queries are interactive. Thus, we have a constrained optimization problem. Our constraint is the h-split search cost, which we define to be the maximum number of aggregates that must be scanned to answer any point cube query. For example, if we prune subtrees, aggregates, or dimensions at Year, then this number will be 12 (as there are 12 values of Month for a value of Year). So, the optimization problem is:

Optimize: Given an h-split forest F. maximum h-split search cost M, a model of the search cost, and model of update cost, what is the smallest update cost possible in a pruned hierarchically split cube tree such that the h-split search cost for every point cube query is no more than M?

2.6.2 Lattice Structured Dimensions

Figures 6A, 6B, 6C:
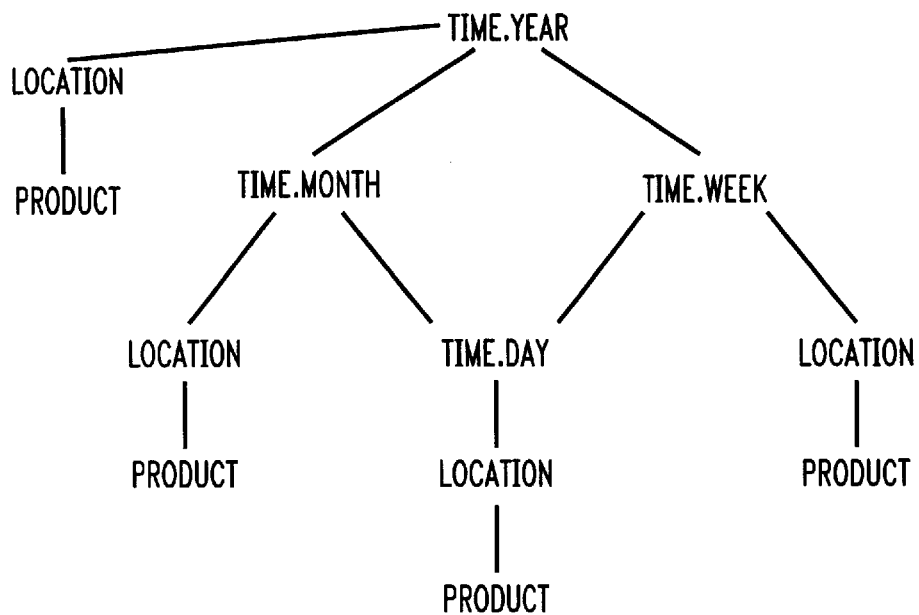
FIGS. 6(a)–(c) depict a lattice-structured dimension in an hierarchically split cube forest according to the present invention.

Dimensions often have multiple hierarchies. For example, the Time dimension might have the hierarchies (Time.year, Time.month, Time.day) and (Time.year, Time.week, Time.day). We can construct a h-split forest when the dimensions are lattices in a manner analogous to when the dimensions are hierarchies. FIGS. 6(a)–(c) show an example of a h-split forest template using the above lattice for the Time dimension (we do not expand the Product or Location dimensions to avoid cluttering the picture). The dotted line joining Time.week to Time.day indicates that the aggregate for a week can be constructed from combining aggregates for a day, but that no subtree is constructed. The algorithms discussed in this document will handle any lattice-structured dimension as long as the lattice is a fork-join graph.

There is one subtlety about handling lattice structured dimensions using cube forests. The root of every lattice is an implicit all node, which represents aggregation over all values of the dimension. The all node does not correspond to an entity that is explicitly represented in the cube forest. As an implication, a lattice-structured dimension will create multiple trees if the all node has multiple children. For example, we might decide that weeks do not divide evenly into years, so the Time dimension has two hierarchies: (all, year, month, day) and (all, week, day). The dimension will therefore be represented by two trees, one with attributes (year, month, day) and the other with attributes (week).

3 Cube Forest Template Design Algorithms

Our basic models of query and update costs are described previously. Let us now consider an example of evaluating the batch update cost. We will assume that all leaf nodes cost the same to update, updating non-leaf nodes is free, and that:

| | | | |
|---|---|---|---|
| $1/cl_{1,1} = 5$ | $1/cl_{2,1} = 2$ | $1/cl_{3,1} = 5$ | |
| $1/cl_{1,2} = 5$ | $1/cl_{2,2} = 2$ | $1/cl_{3,2} = 5$ | |
| $1/cl_{1,3} = 5$ | $1/cl_{2,3} = 2$ | $1/cl_{3,3} = 3$ | $1/cl_{3,4} = 5$ |

Figure 7A:
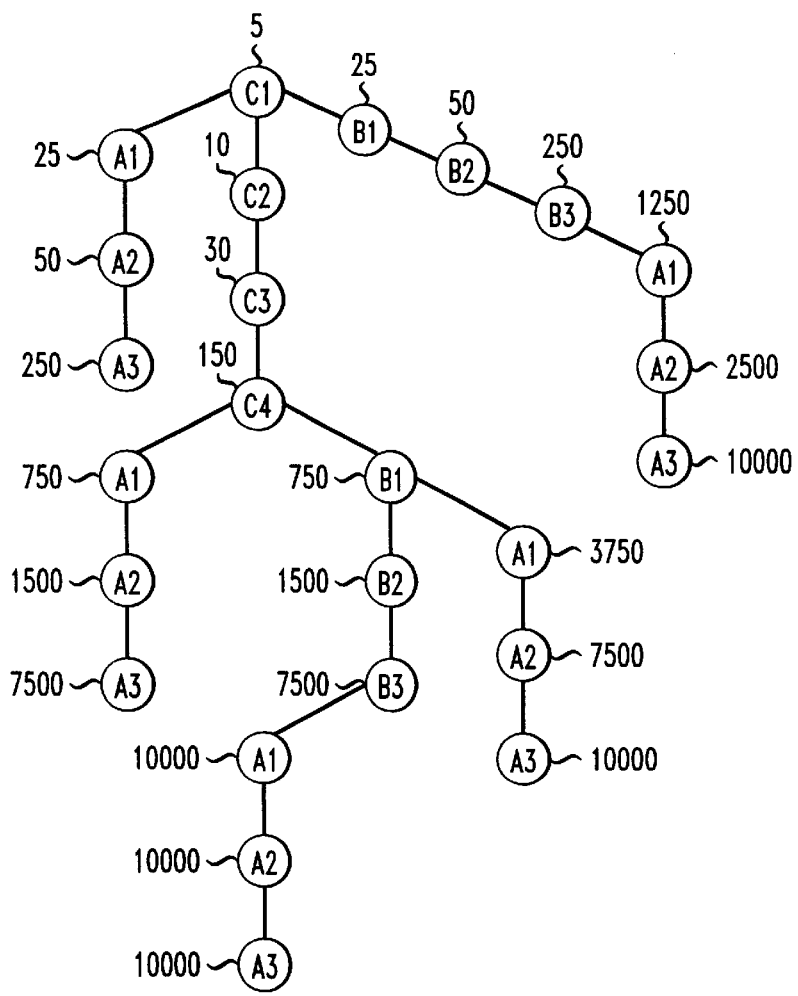
FIGS. 7(a)–(c) depict the batch update cost in the model of the present invention.
Figure 7B:
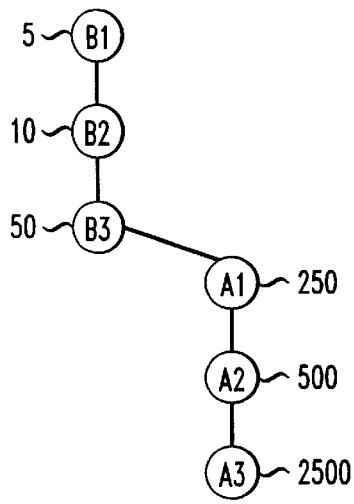
Figure 7C:
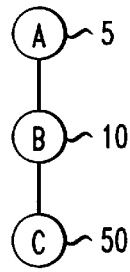

Then, the update cost for 10,000 updates is 40,050, or 4.0 index paths accessed per update for the forest in FIG. 7. Each node is marked with the number of unique values of its attribute.

FIG. 7 depicts that the batch update cost in our model is the sum of the numbers of values at the leaves (here shown with larger font).

Let us assume that we are told the order in which the dimensions appear in the largest tree (i.e., that $D_1$ is the leaf dimension and $D_H$ is the root dimension). Given an order on the dimensions, we can find a minimum cost pruned cube forest template. The cube forest template that we return is the minimum cost template among all possible ordering of the dimensions.

In this following, we present a set of algorithms for computing an optimally pruned cube forest. The first algorithm we present permits pruning on subtrees when all dimensions are a hierarchy. The second algorithm we present also permits pruning dimensions. Third, we handle lattice-structured dimensions. Finally, we show how the first three algorithms can be modified to handle pruning aggregates. In these descriptions, we give dynamic programming algorithms to compute the constrained minimum update cost. Constructing the minimum update cost forest is performed by using the usual techniques of dynamic programming.

3.1 Pruning Subtrees

Note that in dimension c, each value of attribute $A_{c,i}$ specifies a range over the values of $A_{c,i+1}$. Often, these ranges are of a small and predictable size (for example, twelve months in a year). Let fanout(c,i) be the number of values of $A_{c,i+1}$ that $A_{c,i}$ ranges over. Suppose that $A_{c,i} \in$ point(q) for some point cube query q. A path P that can answer q must contain a path leading from a root of dimension c to $A_{c,j}$ as a subpath. If P also contains a path leading from $A_{c,j}$ to a descendent $A_{c,i}$ of $A_{c,j}$ then the point query on $A_{c,j}$ turns into a range query on $A_{c,j}$. We can evaluate Cost(q,P) by interpreting each attribute in P as requiring either a point search or a range search. Let $N_k$ be the number of unique subkeys of the instantiated index represented by the attributes of the nodes in P. Suppose that he k-th node in P is labeled $A_{c,i}$. Then, (i) $N_0 = 1$ (ii) if $A_{c,j}$ is in point-attribute (q), then $N_k = N_{k-1}$ else $N_k = N_{k-1} *$ fanout (c,j).

Before we develop the algorithm for optimizing the pruned h-split forest, let us define some terms.

$D_1, \ldots, D_H$ are the dimensions, where $D_H$ is the root dimension and $D_1$ is the leaf dimension.

$n_c$ is the number of attributes in dimension c.

$T_c$ refers to a subtree that is a pruned h-split tree on dimensions $D_1, \ldots D_c$.

$A_{c,i}$ is the $i^{th}$ attribute in $D_c$, $i=1, \ldots, n_c$.

Fanout(c,0) is the number of unique values of $A_{c,1}$ fanout(c,i) is the number of values of attribute $A_{c,i+1}$ that a value of attribute $A_{c,i}$ ranges over.

f(g) is fanout(c,i), if template node g represents attribute $A_{c,i}$.

$cl_{c,i}$ is the clustering of $A_{c,i}$.

uc(g, S) is the cost to update aggregates represented by the template node g when the number of unique keys in the batch is S before reaching g. To make the equations work properly, we set uc(g, S)=$K_g cl_g S$, where $K_g$ is a constant that indicates the "difficulty" of updating an aggregate represented by template node g. The model of batch update cost discussed previously sets $K_g$ to 0 for non-leaf template nodes g. When we incorporate aggregate pruning, we need to set $K_g$ to a positive value to get non-trivial results.

UC(g, S, $M_0$) is the minimum cost to update aggregates in copies of the tree rooted at g when the number of unique keys in the batch is S before reaching g, given that the maximum search cost on the tree over all queries is bounded by $M_0$ for any compatible query.

TC($T_j$, S, $M_0$) is the minimum cost to update aggregates in copies of subtree $T_j$ when the number of unique keys in the batch is S before reaching g, given that the maximum search cost on $T_j$ is bounded by $M_0$ for any query compatible with $T_j$.

FC(c, S, $M_0$) is the minimum cost to update aggregates in copies of a forest which represents dimensions 1 through c when the number of unique keys in the batch is S before reaching g, given that the maximum search cost is bounded by $M_0$ for any compatible query.

sort(N) is the cost of sorting N tuples.

M is the maximum search cost over all queries.

B is the update batch size.

We start by assuming that sorting is free (i.e., sort(N)=0), and introduce the sorting cost later (it is a minor complication). Let g be a node in the h-split forest, representing attribute $A_{c,i}$, g' be its co-dimensional child, and $T_1, \ldots, T_c$ be the non-co-dimensional subtrees attached to g and g'. We have the choice of either pruning or not pruning g in the h-split forest, illustrated in FIGS. 8(a)–(b). Pruning g saves the cost of updating its non-co-dimensional subtrees. However, pruning g will cause some queries to access f(g) copies of g' (to execute the range aggregation).

Figure 8A:
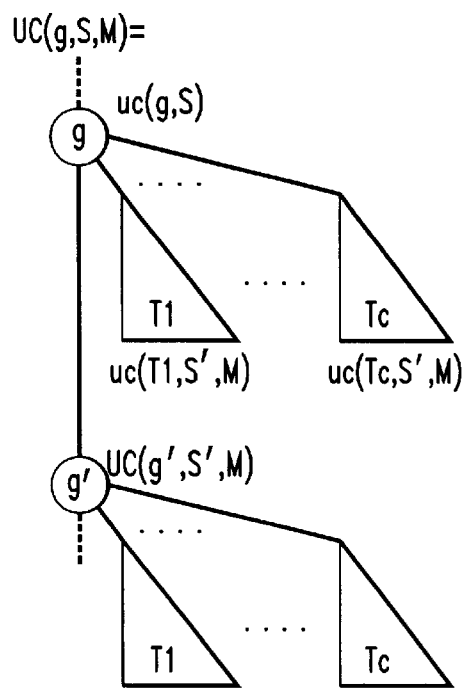
FIGS. 8(a)–(b) depict the costs of pruning or not pruning node g according to the present invention.
Figure 8B:
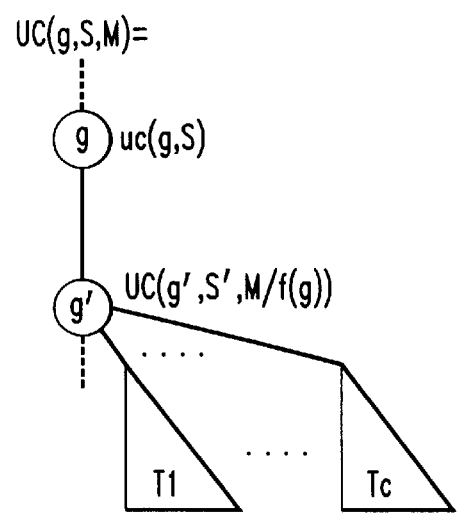

FIGS. 8(a)–(b) depict the costs of pruning or not pruning node g.

Suppose that g represents attribute $A_{c+1,i}$. If we decide not to prune g, the update cost is the cost of updating g, the subtrees attached to g, ($T_1, \ldots, T_c$, each pruned up to a maximum search cost of M), and the cost of updating the co-dimensional subtree rooted at g' (pruned up to a maximum search cost of M). Let us call the path from the root of the tree containing g to the ancestor of g to be P. Suppose that in a batch update, there are S unique subkeys in the batch when the tuples are projected onto P. Then, our clustering formula tells us that there will be min(B,S/$cl_g$) unique subkeys in the batch when the batch is projected onto P augmented with g. So the minimum cost of updating S copies of the template tree rooted at g constrained by a maximum search cost of M, given that we do not prune g, is:

$$UC_{no-prune}(g, S, M) = UC(g', \min(B, S/cl_g), M) + FC(c, \min(B, S/cl_g), M) + uc(g, S)$$

Here, UC(g', min(B, S/cl$_g$), M) is the cost of updating the min(B, S/cl$_g$) copies of the c non-co-dimensional subtrees rooted at g', $$\sum_{i=1}^{c} uc(T_i, \min(B, S/cl_g), M)$$

is the cost to update the min(B, S/cl$_g$) copies of the non-co-dimensionals subtrees of g, $T_1, \ldots, T_c$, and uc(g, S) is the cost of updating the copies of g itself If we decide to prune g, the update cost is the cost of updating the min(B,S/cl$_g$) non-co-dimensional subtrees rooted at g' plus the cost of updating the S copies of g. Since g was pruned, up to f(g) copies of g' will be accessed by some queries, so the search cost constraint on g' is M/f(g). That is, $$UC_{prune}(g, S, M) = UC(g', \min(B, S/cl_g), M/f(g)) + uc(g, S)$$

The decision of whether or not to prune g is determined by whether $UC_{prune}(g, S, M_0)$ is smaller than $UC_{no\text{-}prune}(g, S, M_0)$. That is, $$UC(g, S, M) = \min(UC_{prune}(g, S, M), UC_{no\text{-}prune}(g, S, M))$$

Solving this recurrence for UC(g, S, M) requires an iteration over S in a dynamic programming implementation. Since S can range between 1 and B, and B can be very large, the solution can be too expensive to obtain. We can resolve this problem by observing that if B is large enough, the min(. . .) function always returns S/cl$_g$. Therefore, uc(T$_i$, S) and uc(T$_i$,S') differ by a scaling factor:

$$uc(T_i, S) = \frac{S}{S'} uc(T_i, S').$$

In particular, uc(T$_i$,S)=S*uc(T$_i$,1). Revisiting the formulae for $UC_{no\text{-}prune}$ and $UC_{prune}$, we get:

$$UC_{no\text{-}prune}(G, S, M) = cl_g * (UC(g', S, M) + FC(c, S, M)) + uc(g, S)$$

$$UC_{prune}(g, S, M) = cl_g * UC(g', S, M/f(g)) + uc(g, S).$$

Since the S parameter is applied uniformly to all parts of the recurrence, we can drop it from the parameter list to get:

$$UC_{no\text{-}prune}(g,M) = cl_g * (UC(g',M) + FC(c,M)) + uc(g)) \quad (3)$$

$$UC_{prune}(g,M) = cl_g * UC(g',M/f(g)) + uc(g) \quad (4)$$

There are some special cases to handle:
1. If f(g)>M, then we can't prune g. Therefore, UC(g, M)=$UC_{no\text{-}prune}$(g,M).
2. If g represents $A_{c,nc}$, then we can't prune g's subtrees, or else the pruned h-split forest won't be compatible with all queries. Instead, we use: UC(g,M)=$UC_{no\text{-}prune}$(g,M).

To use the recursive definition of UC, we need to find the update cost of every tree in the cube forest. That is, $$\text{Cost}_{update} = FC(H,M) \quad (5)$$

The update costs of the subtrees T$_i$ are repeatedly re-used. This property suggests that we can write an efficient dynamic programming algorithm to compute UC(r$_i$, M). In the following pseudo-code, A$_{c,i}$ is the node which represents the i-th attribute of dimension c in T$_c$. We assume that uc(g) is initialized to an appropriate value and that FC(0,.)=0.

```
for c from 1 to H do {
    for i from n_c to 1 do {
        for M_0 from 1 to M do {
            Compute UC(A_{c,i}, M_0)
        }
    }
    for M_0 from 1 to M do
        TC(T_c, M_0) = UC(A_{c,1}, M_0)
        FC(c, M_0) = FC(c-1, M_0) + TC(T_c, M_0)
}
```

Let Nattr=$n_1 + \ldots + n_H$, and let T(M, Nattr, H) be the running time of the optimization algorithm on H dimensions with a total of Nattr attributes and a maximum search cost of M. Then, Theorem 4. T(M, Nattr, H)=O(M*Nattr*H)

Proof: For every value of $M_0$=1 . . . M, we need to compute UC($A_{i,j}$, $M_0$) for every dimensional attribute. This step involves summing over O(H) values.

For example, consider FIGS. 9(a)–(c). The example has 3 dimensions $D_1$, $D_2$, and $D_3$.

Dimensions $D_1$ and $D_2$ contain 3 attributes, while $D_3$ contains 4 attributes. Their cardinalities are:

| | | |
|---|---|---|
| f($a_{1,1}$) = 10 | f($a_{2,1}$) = 2 | f($a_{3,1}$) = 10 |
| f($a_{1,2}$) = 10 | f($a_{2,2}$) = 2 | f($a_{3,2}$) = 10 |
| f($a_{2,3}$) = 2 | f($a_{3,3}$) = 3 | f($a_{3,4}$) = 10 |

Suppose we decide that the maximum search cost is 25, and we use the clusterings defined for FIG. 7. The optimal pruned h-split forest is shown in FIGS. 9(a)–(c). The scaling factor of each node is listed next to the node. If the batch size is at least B=375,000 updates, then 470,400 paths are searched, or 1.25 search paths per update.

FIGS. 9(a)–(c) depict an h-split forest which minimizes the batch update cost.

The recurrence can be modified to incorporate the cost of sorting for the batch updates. This is accomplished by modifying the formula for $UC_{no\text{-}prune}$ to account for the cost of sorting the tuple list for the updated subtrees (The cost of sorting for each tree is not included here, but this cost does not affect the optimization.):

$$UC_{no\text{-}prune}(g,M) = cl_g(UC(g',M) + FC(c,M)) + c * \text{sort}(B/S_g) + uc(g) \quad (6)$$

Finally, we note that the recurrences of equations 3 and 4 can be used to compute an optimally h-split forest in the case when updates are applied singly. Since only one copy of any tree represented by a template node is accessed in an update, $S_g$=1 for every template node g.

For an example, let us use the parameters from FIGS. 8(a)–(b). Suppose we decide that the maximum search cost is 25, and that the update cost is proportional to the number of nodes in the forest template. Then we set uc(g)=1 and execute the algorithm. By testing each permutation of the dimensions, we can find an optimal design, shown in FIGS. 10(a)–(b). In this forest, 59 of the 80 nodes in the full h-split forest have been pruned, and the maximum search cost is 25 or less.

Figure 10A:
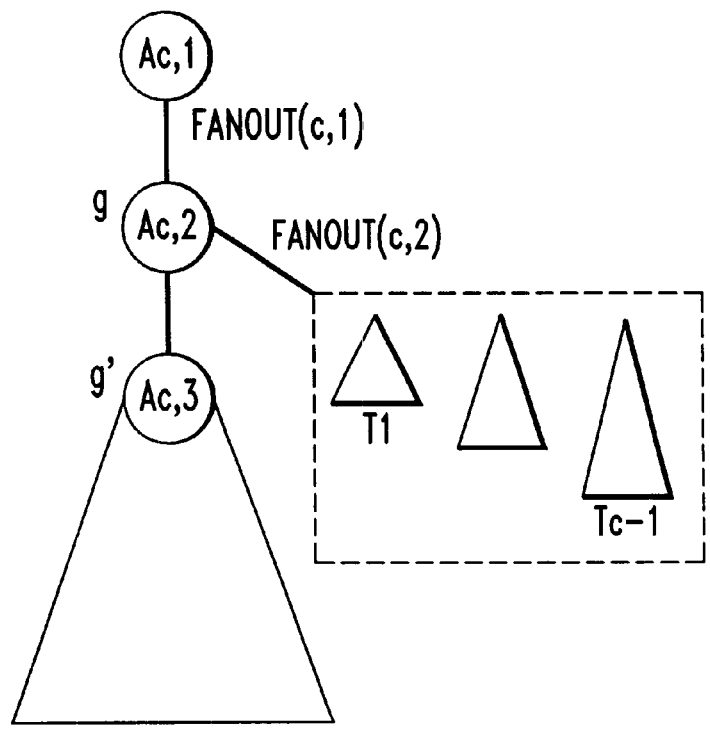
FIGS. 10(a)–(b) depict pruning a dimension at node g according to the present invention.

FIG. 10(a) depicts a pruned forest to minimize template nodes.

3.2 Pruning Dimensions

Let us consider tree T$_c$, as shown in FIG. 10(a). If we prune a dimension at node g, representing $A_{c,2}$, then $A_{c,1}$ should be subtree-pruned. For otherwise, $A_{c,1}$ would be a better place to prune a dimension. In addition, $A_{c,2}$ cannot be subtree-pruned, for otherwise we could not answer queries compatible with $T_1$ through $T_{c-1}$ through the subforest rooted at $A_{c,2}$.

If we prune a dimension at g, representing attribute $A_{c,i}$, we do not need to pay an update cost of FC(c−1, M) to update the pruned forest. However, we need to pay the update costs on nodes $A_{c,1}$ through $A_{c,i}$, the update cost of the subforest representing dimensions 1 through c−1 attached to node g, and the update cost of the tree rooted at the co-dimensional child g'.

To compute the value of pruning a dimension at a node, we need to make explicit calculations of the value, as opposed to building up the value recursively. We need to explicitly define the fanout of a query and the spread of the batch at a node in a tree. We define:

$$N_{c,i} = \prod_{j=1}^{i} fanout(c, j)$$

$$S_{c,i} = \prod_{j=1}^{i} \frac{1}{cl_{A_{c,j}}}.$$

Then, if we prune a dimension at node g representing $A_{c,i}$, the cost to update the forest representing trees $T_1$ through $T_c$ is:

$$ec_i(c, M) = \sum_{j=1}^{i} S_{c,j-1} * uc(c, j) +$$

$$S_{c,i}FC(c-1, M/(fanout(c, 0)*N_{c,i-1})) + S_{c,i}UC(A_{c,i+1},$$

We first use the algorithm derived previously to compute the values $UC(A_{c,j}, M_0)$. Next, we compute $FC_{dim.prune\ c,i}$ ($c, M_0$) for each $M_0 = 1, \ldots, M$ and $i = 1, \ldots, n_c$. We choose $FC(c, M_0)$ to be the smallest value among $UC(A_{c,1}, M_0)$ and $FC_{dim.prune\ c,1}(c, M_0), \ldots, FC_{dim.prune.c,nc}(c, M_0)$. A special case occurs if $fanout(c, 0)*N_{c,j-1} > M_0$, which case we cannot prune a dimension at $A_{c,i}$ for c from 1 to H do {
  for i from $n_c$ to 1 do {
    for $M_0$ from 1 to M do {
      Compute $UC(A_{c,i}, M_0)$
    }
  }
  for $M_0$ from 1 to M do
  $TC(T_c, M_0) = UC(A_{c,1}, M_0)$
  for $M_0$ from 1 to M do {
  for i from 1 to n, do {
  Compute $FC_{dim;\ prune;c,i}$ (c,M)
  }
    $FC(c,M_0) = \min(FC(c-1, M_0) + TC(T_c, M_0),$
      $FC_{dim;prune;\ c,1}(c,M), \ldots, FC_{dim;prune;c,nc}(c,M))$
  }
}

Figure 10B:
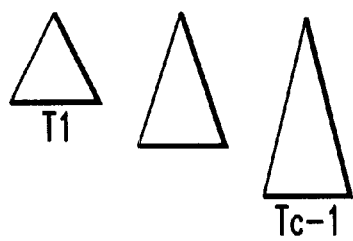

FIGS. 10(a)–(b) depict a pruning dimension at node g.

3.3 Lattice Structured Dimensions

To handle a lattice-structured dimension, we find a spanning tree on the lattice, then remove the node representing "all values." The result has two complications:

A node might have two or more co-dimensional children.
  After removing the root node, the spanning tree on the lattice might form two or more trees.

Since a node might have multiple co-dimensional children, we need to modify our cost formulae to range over all co-dimensional children. For example, the formula for $UC_{no-prune}$ becomes:

$$UC_{no-prune}(g, M) = cl_g \left( \sum_{g'\ a\ child\ of\ g} UC(g', M) + FC(c, M) \right) + uc(g, S)$$

If the dimension has more than one root, we first run the algorithm of developed earlier one each tree. At most one of the trees for the dimension needs to have an attribute be dimension-pruned. So, we compute $FC_{dim;prune;c,i}$ for every node in the dimension and compute $FC(C,M_0)$ by summing the update costs of each individual tree, and allowing at most one of the trees to have a dimension-pruned attribute.

Since there are several spanning trees for a lattice, we need to iterate over all possible spanning trees.

3.4 Pruning Aggregates

In the standard cost model, pruning aggregates produces no benefit since $K_g = 0$ for non-leaf g. If $K_g > 0$ for non-leaf g in the leaf dimension, then the algorithms discussed in this section will prune aggregates if equation 3 is modified to become $UC_{prune}(g,M) = cl_g * UC(g', M/f(g))$.

4 Cube Forest Data Structures

An efficient implementation of a cube forest requires tight integration between the forest structure and the update and query algorithms. In this section, we describe the data structures used to implement a cube forest.

The design of the cube forest data structures is as follows. Suppose that we are given cube forest template F. We design an index on each tree T ∈ F. Given a h-split tree template T, we choose a path from the root of T to be the spine of the tree. The spine defines a composite index, the keys of which are the attributes of the nodes in the spine concatenated together. In our examples, the spine is the longest root-to-leaf path in the tree. The spine partitions the h-split template, creating several subtrees. A spine is found for each subtree, and the process continues until all template nodes are in some spine.

Suppose that an index instantiates a spine on attributes $(A_1, A_2, \ldots, A_n)$. For every key $(a_1, a_2, \ldots, a_n)$ that is inserted into the tree, let us define the i-th subkey, denoted $sk_i$, to be the prefix consisting of $(a_1, a_2, \ldots, a_i)$. If the template node corresponding to $A_i$ has children other than $A_{i+1}$, then we need to associate a set of subtree pointers with subkey $sk_i$. If the node corresponding to $A_i$ is not aggregate pruned, we need to associate an aggregate value with $sk_i$. We define an effective leaf for subkey $sk = (a_1, \ldots, a_i)$ to be the place in the index where information associated with the subkey (subtree pointers and aggregate values) is stored. The index invariant that defines the location of an effective leaf for sk should hold true at a single place in the index, and this place should be on the search path to any key k whose subkey is sk.

We build our spine index from a B-tree. We place an effective leaf for subkey sk at the highest level in the B-tree (closest to the root) where sk is a subkey of a separator (the i-th separator in a B-tree node is a key that indicates which keys can be found in the i-th subtree as opposed to the i+1st subtree) in a node, or a key in a leaf (to simplify the discussion, we will regard keys in leaves as separators). If there is more than one such separator, we place the effective leaf at the rightmost separator whose prefix is sk (one can also use the leftmost separator, the logic will be symmetric).

This definition of the location of an effective leaf ensures that any insert operation for a key whose prefix is sk will encounter the effective leaf on the path to the leaf Effective leaves might move during restructuring (as we will describe), but all such movement is local (i.e., some effective leaves will migrate from the split node and its new sibling to the parent, and some effective leaves in the parent might move). So, we are assured that inserts can be performed efficiently.

Figure 11A:
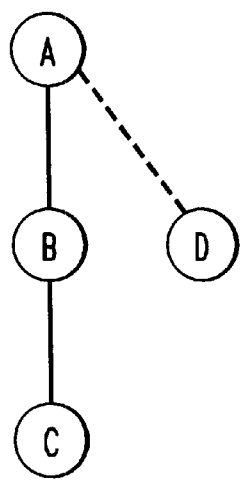
FIGS. 11(a)–(b) depict a B-tree index that supports an hierarchically split tree according to the present invention.
Figure 11B:
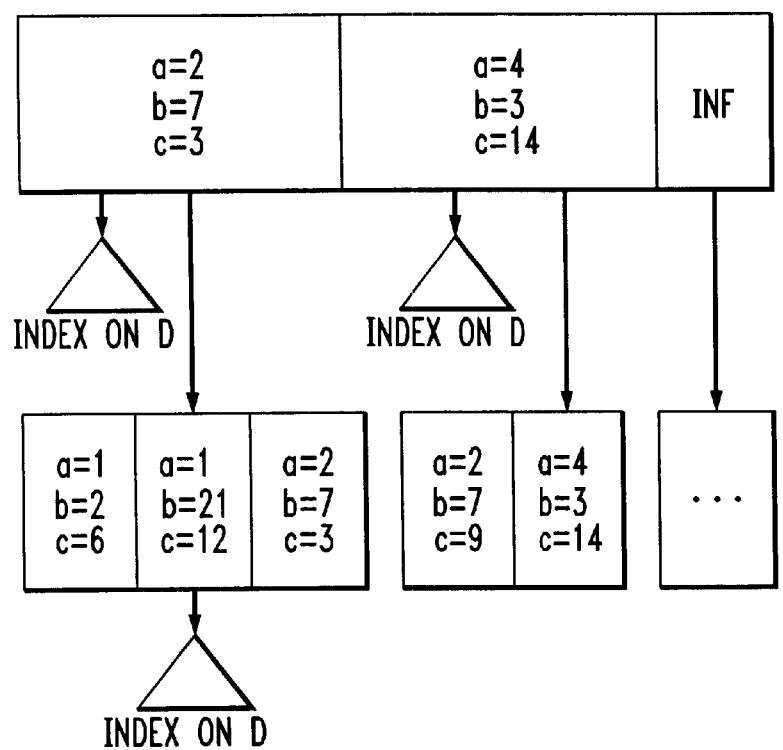

An example is shown in FIGS. 11(a)–(b). The tree template contains attributes A, B, C, and D. We create a spine (indicated by the solid line connecting template nodes) on (A, B, C). The template node D is in a separate partition, and its spine is simply (D). Since the edge A-D is not a spine edge, we draw it as a dashed line. To the right, we show the resulting index on a small sample of data. Note that the key for the index consists of the values of the attributes in the spine catenated together.

To avoid clutter, we do not show where the aggregates are stored, but we illustrate the location of effective leaves by identifying where the pointers to indices on D are stored. The two separator keys in the root are effective leaves for the subkeys a=2 and a=4, respectively. We note that these separator keys are also effective leaves for the subkeys (a=2,b=7), (a=2,b=7,c=3), (a=4,b=3), (a=4,b=3,c=14), and the required aggregate information is stored in those effective leaves. The leftmost child of the root has an effective leaf for a=1 in its middle entry (i.e., the rightmost separator key with subkey a=1). The rightmost entry in this leaf is not an effective leaf for the subkey a=2, because this effective leaf can be found in the parent. Note that an insert of a key with subkey a=2 might be directed to this leaf, or to its right sibling. In either case, the insert operation will encounter the effective leaf for a=2, which is stored in the parent node.

FIGS. 11(a)–(b) depict a B-tree index that supports a h-split tree.

4.1 Insertion Algorithm

The algorithm for inserting a key value into the index uses the usual B-tree insertion algorithm. However, there are two additional tasks that must be performed—updating aggregate values at all effective leaves whose subkeys are prefixes of the insertion key, and preserving the effective leaf location invariant. In this section, we describe how to accomplish these tasks. We will assume that an effective leaf for subkey sk is located in the highest node n in the tree where a separator key k with subkey sk appears, and at the rightmost such separator if more than one separator has subkey sk in n.

4.1.1 Update Descent

The first task is to update all aggregates associated with a subkey on the descent into the index. We define the following variables:

| | |
|---|---|
| n | Number of key values that comprise the aggregate key. |
| curr_eff_leaf | Length of the subkey of the next effective leaf to match. |
| r | Record that is being inserted into the cube forest. |
| key | Aggregate key derived from r for the index. |
| v | Value attributes of r. |
| node | Index node currently under examination. |
| node.num_children | Number of separator keys in this node. |
| node.separator[i] | Key value that separates key values in subtrees i and i + 1. |
| node.eff_leaf[i][j] | Data associated with the effective leaf whose subkey is the length j prefix of node of the node.separator[i]. This includes aggregate values and subtrees corresponding to subtree branches of the jth node of the spine (if any). |
| node.child[i] | Child node of node. |

We assume that all keys stored in subtree node.child[i] have key values less than or equal to node.separator[i] (leaf nodes do not include the array node.child[..]). In the following code segment, we assume that we have already determined that node.separator[k] is the separator with the smallest value larger than or equal to key. If node is a non-leaf node, we would navigate to node.child[i]; otherwise we need to insert key into the index if key is not equal to node.separator[k].

The action of the code fragment can be summarized as follows. Let $sk_i$ be the subkey of key of length i. To ensure that we find the highest node in the index where $sk_i$ occurs, we search for as many subkeys of key as possible at every node in the search path. We do not need to match previously found subkeys, and if $sk_i$ does not appear in the node, then $sk_{i+1}$, does not appear in the node. If $sk_{curr\_eff\_leaf}$ then appears in the node, then it will appear as a subkey of at least one of node.separator[k−1] and node.separator[k]. If the prefix of node.separator[k] is $sk_{curr\_eff\_leaf}$ then the effective leaf curr_eff_leaf is located at the highest index j such that the prefix of node.separator[j] is $sk_{curr\_eff\_leaf}$. Otherwise, if the prefix of node.separator[k−1] is $sk_{curr\_eff\_leaf}$ then the index of the effective leaf curr_eff_leaf is k−1. If we find the effective leaf, we update the associated aggregate with the value attributes, and we insert r into each subtree associated with the effective leaf.

Recall that because of pruning, a subkey of length i might not have any information associated with it, and thus will have no effective leaf In this section, we will search for the effective leaf of $sk_i$, but any operations on the effective leaf are null, and no effective leaf is actually stored. This convention greatly simplifies the presentation of the algorithm.

```
// Find all effective leaves that match key in this node.
Done=false;
while(not done){
    found_effleaf=false
    if( key matches node.separator[k] on the subkey of length
        curr_eff_leaf){
        found_effleaf=true
        set efl_idx to be the largest index j such that key
            matches
node.separator[j] on the subkey of length curr_eff_leaf
    }else{
        if((k>0) and (key matches node.separator[k−1] on the
            subkey of
        length curr_eff_leaf){
            found_effleaf=true
            efl_idx=k−1
        }
    }
    if(found_effleaf is true){
        add v to the aggregate value stored in node.eff_leaf
            [efl_idx] (if any)
        For every subtree st in node.eff_leaf[efl_idx]
            insert r into st
        curr_eff_leaf++
        if(curr_eff_leaf>n){
            done=true
        }
    }else{
        done=true
    }
}
```

When we reach the leaf, l, we insert an entry for key into l only if key is not already present in l. As an optimization, we can stop descending the index when we have found all n effective leaves. If we insert an entry for key in l, we need to attach all effective leaves located at the entry for key. These are all of the effective leaves numbered curr_eff_leaf through n. Initializing the effective leaf consists of initializing the aggregate value with v (if any), creating all subindices of the effective leaf (if any) and inserting r into them. Finally, we must preserve the invariant that effective leaves are located at the rightmost position where the separator contains the subkey. So for all subkeys of key of length less than curr_eff_subkey, we need to search for effective leaves to the left of the position where key was inserted. If we find effective leaves for subkeys of key, we transfer their location to the location of key. We can speed up the search process by observing that the effective leaf for $sk_{i-1}$ must be located at or to the left of the location of the effective leaf for subkey $sk_i$, and if the effective leaf for $sk_i$ does not exist in l, then the effective leaf for $sk_{i-1}$, does not exist in l.

If a key insertion causes a node to split, the usual restructuring operations are performed. In addition, the effective leaf location invariant must be maintained. The key value that is promoted to the parent is the rightmost separator in the left sibling of the pair of nodes that results from the split. All effective leaves are promoted along with the separator (key) value. If there is an effective leaf for subkey $sk_i$ of the promoted separator in the right sibling, then it should be promoted to the newly inserted separator. The optimizations for finding these separators are the opposite of those described in the previous paragraph (i.e., substitute "right" for "left"). The separator that is inserted into the parent node might now contain a rightmost $sk_i$ for an effective leaf in the parent. These effective leaves must be moved to the newly inserted key, and the optimizations for performing this migration are the same as that described in the previous paragraph.

Cube Forest Batch Update Algorithms

Our batch update algorithm for inserting tuples into the forest works as follows. Given a set of tuples to insert into the cube forest, we partition the tuples into subsets that can be processed in main memory (perhaps only one partition is required). For each partition, we insert the tuples of the partition into each index that comprises the forest.

To insert a batch of tuples into an index, we first sort the batch on the spine attributes of the index using an in-memory sort. For each tuple in the batch, we descend the index until the last effective leaf is found. We do not perform any processing with the effective leaves that are found, instead we make note of the location of the effective leaves. If necessary, we insert the spine key (and initialize any new effective leaves) and perform restructuring. If an effective leaf for the recently inserted key changes location during restructuring, we note its new location. We compare every subkey of the recently inserted tuple against the corresponding subkey of the next tuple in the batch. If a subkey of the current tuple matches the subkey of the next tuple, we defer the update of the aggregates and the non-spine subtrees (if any). Otherwise, we perform all deferred aggregate updates for the associated effective leaf, and for all of its subtrees. We perform the subtree updates by making a recursive call to the batch insert algorithm.

6 Cube Forest Query Algorithms
6.1 Retrieving Single Data Point

Let us assume that in the cube forest template, the root dimension is dimension H, and the leaf dimension is dimension 1. When a query is submitted, we can represent the query to the query planner as a pair (Q, V). Q is a H-tuple, $Q=(q_1, \ldots, q_H)$, $q_i$ is the index of the finest attribute specified for dimension i in the where clause, or −1 if dimension i is not specified in the where clause. V is a set of triples $\{(c_i, a_i, v_i)\}$, where there is a (c,a,v) entry in V each time $a \leq q_c$. The set V represents the values specified for the attributes in the where clause of the query.

The first step in processing the query is to develop a strategy for computing the answer, and the second step is to use the query plan to generate the answer from the index.

6.1.1 Generating the Query Plan

Given Q, let $D=@(d_1, \ldots, d_l)$ be the indices of the dimensions such that $q_{d_i} \approx -1$ and $d_i > d_{i+1}$. To gain an intuition behind the query planner, let us assume for the moment that all dimensions are hierarchies, no dimensions have been pruned, and that each spine of a tree template contains exactly the contiguous nodes of a single dimension.

Start at the index whose template is rooted with dimension $d_0$. Search the index until you reach an effective leaf of length $q_{d_1}$ (with the appropriate subkey value). If l=1, return the aggregate value stored in this effective leaf. Otherwise, we need to find an effective leaf of dimension $d_2$ of length $q_{d_2}$. If attribute $q_{d_1}$ has the root attribute of $d_2$ as a child, then repeat this procedure on $d_2$. Otherwise, find the closest co-dimensional child $r_1$ that has the root of $d_2$ as a child. Find all effective leaves $l_1$ of length $r_1$ that match the query on the first $q_1$ attributes. If l=1, sum the aggregates contained in the effective leaves and return this value. Else, repeat the procedure for the next dimension.

We can view the query plan as a sequence of attributes to match in the effective leaves of the indices we traverse. The matching might be on a single value, or on all values.

There are two additional complications. Let g be the template node corresponding to the node for dimension $d_1$, attribute $q_{d_1}$ on the path that we are constructing. If g is aggregate-pruned, we need to extend our search path to range over the nearest descendent of g that is not aggregate pruned.

The second complication involves navigating to a node representing dimension $d_k$, attribute $q_{d_k}$. If dimension $d_k$ has a lattice structure, then the path to attribute $q_{d_k}$ in general can not be found by starting from attribute $A_{d_k,1}$ and traversing the co-dimensional child $q_{d_k}$ times. A lattice-structured dimension might be represented by multiple trees, and a node in the tree might have multiple co-dimensional children. Furthermore, the forest representing dimensions 1 through $d_{k-1}$ might be dimension-pruned. If so, the path from the node representing dimension $d_{k-1}$, attribute $r_{k-1}$ might need to traverse nodes of dimensions other than $d_{k-1}$ or $d_k$.

To resolve the second problem, we assume that the array Path(n,c,i) has been precomputed for every node in the cube forest template. For a node n, Path(n,c,i) is the path through the forest to reach the closest node representing $A_{c,i}$, from node n. This array can be computed by a forest search, or while the dynamic programming algorithm is executing. We also compute this array for the "empty" node, Φ, whose children are the trees in the cube forest.

We make use of another function to simplify the algorithm. Given a template node p representing $A_{c,a}$, function value(p) returns the value v such that (c,a,v) ∈ V.

Let n=Φ
Initialize query_plan to ( ).
For i=1 to l do {
    For each p in Path (n, $d_i$, $q_{d_i}$) do {
        if dimension(p)<>$d_i$ {
            append [dimension(p), attribute(p), *, sum] to query_plan

```
    }else{
        append [dimension(p), attribute(p), value(p), single]
            to
    query_plan
    }
}
let n be the node representing dimension d_i, attribute q_i.
If i<l do {
    While n is a subtree-pruned node do {
        Let n' be a co-dimensional child of n
        append [dimension(n'),attribute(n'),*,sum] to
            query_plan
        Let n=n'
    }
}else
    While n is a aggregate-pruned node do {
        Let n' be a co-dimensional child of n
        append [dimension(n'),attribute(n'),*,sum] to
            query_plan
        Let n=n'
    }
}
}
```

If a dimension is lattice-structured, then one can have several choices of co-dimensional child n' of n. If the cube forest template is built using the cube forest construction algorithms of Section 4, any of the children is acceptable. If one of the children is in the same spine, then that child is the preferable one to include in the path.

6.1.2 Executing the query plan

The query plan specifies the set of attribute values that must be searched to find the set of aggregates to sum. Because the query planner follows the template, we are guaranteed that the specified paths exist in the index. However, the path will traverse a sequence of spine indices. Each of these spine indices must be searched in turn. Fortunately, searching each spine index uses the same algorithm, so we can write a recursive routine to perform the search for us.

```
aggregate_value query_tree(index I,query_plan_type
    qp){
    Initialize return_aggregate to empty.
    Let qp_I be the portion of qp whose attributes are indexed
        by I.
    For each effective leaf l in I of length len(qp_I) that matches
        qp_I on its single attributes {
        if qp_I is a suffix of qp
            add the aggregate contained in l to return_aggregate
        else{
            Let I' be the index rooted by the entry of qp that
                follows qp_I.
            add query_tree(I',qp) to return_aggregate
        }
    }
    return(return_aggregate)
}
```

Searching I for all effective leaves that match qp_I can require a search of the entire space of I. Let single_prefix (qp_I) be the prefix of qp_I such that all the specified attributes are single. Since all effective leaves l that match qp must have a prefix specified by single_prefix(qp_I), we need search I in places where keys matching single_prefix(qp_I) can be found.

6.2 Retrieving a Group-By Query

In a group-by query, we want to return an aggregate for every value in a specified range that matches a set of conditions specified in the where cause. We specify the group-by query by a triple, (Q, G, V). The Q and V elements are the same as in Section 6.1 G is an H-tuple, G=($g_1$ ..., $g_H$), where g is the index of the finest attribute to group-by for dimension i in the group-by clause, or −1 if dimension i is not specified in the group-by clause. Note that $g_i \geq q_i$, because we cannot return aggregate values associated with dimensional attribute values coarser than $d_i$.

The query plan and execution is similar to that for the point query. We define a search path through the cube forest template that includes at least a set of nodes that represent $A_{c,g_c}$ for each c such that $g_c > -1$. The query is executed by finding all effective leaves in an index I that match the query plan. A separate value is returned for every unique value of the attributes specified by G.

Given G, let D=($d_1$, ..., $d_I$) be the indices of the dimensions such that $G_{d_i} \approx 1$ and $d_i \geq d_{i+1}$. The algorithm for generating the query plan is:
Let n=Φ
Initialize query_plan to ( ).
```
For i 1 to l do {
    For each p in Path(n, d_i, q_{d_i}) do {
        if (dimension(p)<>d_i
            append [dimension(p), attribute (p), *, sum] to
                query_plan
        Else if p represents A_{c,i}; and d_c ≤ i
            append [dimension(p),attribute(p),value(p),single]
                to
            query_plan
        else
            append [dimension(p),attribute(p),*,group-by] to
                query_plan
    }
    let n be the node representing dimension d_i, attribute q_i.
    If i<l do {
        While n is a subtree-pruned node do {
            Let n' be a co-dimensional child of n
            append [dimension(n'),attribute(n'),*,sum] to
                query_plan
            Let n=n'
        }
    }else {
        While n is a aggregate-pruned node do {
            Let n' be a co-dimensional child of n
            append [dimension(n'),attribute(n'),*,sum] to
                query_plan
            Let n=n'
        }
    }
}
```

The query plan execution is similar to that for the single point query. Every time we find a new aggregate, we need to determine which combination of group-by dimensional values we need to associate the aggregate with. If effective leaves are examined in order of their key values, all aggregates that are added to a single group-by return value are found consecutively. Therefore, the algorithm is the following.

We use the variables Previous_GB and Current_GB to determine the group-by value that corresponds to the aggregate value. Both variables are sets of triples (c,a,v) for each c and a such that $g_c \geq a$.

Figure 12C:
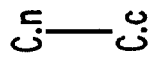
FIGS. 12(a)–(c) depict an hierarchically split cube forest for the (Customer, Supplier, Time) cube (the TSC forest) according to the present invention.

Note: In the algorithm for computing the result of a cube query with a group-by, it turns out that aggregates associated with a particular group-by value will not necessarily be found in consecutive order. For example, suppose the cube forest template is the fully pruned forest depicted in FIG. 12, and the query asks for the sum of sales for 1997 grouped by month and customer nation. The best path is T.y-T.m-T.d-C.n. All aggregates for a given month will be found consecutively, but not for a month-nation combination (30 days per month). The algorithm below takes this into account.

Initially,
Set each triple in Previous_GB to (c,v,null).
set Previous_aggregate_value to null.
Set Answer_list=( )
void query_tree(index I,query_plan_type qp) {
  Initialize return_aggregate to empty.
  Let $qp_I$ be the portion of qp whose attributes are indexed by I.
  For each effective leaf l in I of length len($qp_I$) that matches $qp_I$ on its single
    attributes {
    Update Current_GB with the values of the single, sum, and group-by
      attributes in $qp_I$.
    if $qp_I$ is a suffix of qp {
      if Current_GB<>Previous_GB {
        append (Previous_GB,Previous_aggregate_value) to
          Answer_list
        set Previous_aggregate_value to the aggregate contained in l
      }
      else
        add the aggregate contained in l to
      Previous_aggregate_value
    } else{
      Let I' be the index rooted by the entry of qp that follows $qp_I$.
      query_tree(I',qp)
    }
  }
}

To complete the processing, delete the first entry on Answer_list, then scan through Answer_list and sum the aggregates that have a matching group-by value on the single and group-by attributes. We note that this step can be performed on-the-fly in the main body of the algorithm.

6.3 Range Queries

Ranges can be specified for the Q and G attributes. The query plan is computed in the same way, except that a high and low value are now associated with each single and group-by attribute in the query plan qp (the high and low values are plus and minus infinity for unrestricted group-by attributes). The ranges in qp restrict the effective leaves in an index I that are of interest, only these effective leaves are used to generate aggregate values (either to extract the aggregate or to extend the search).

7 Experimental Results

We implemented a prototype h-split forest to test the practical value of our ideas. We tested the implementation by using data derived from the TPC-D benchmark. In this section we discuss our implementation strategy and our performance results.

7.1 Experiments

We modified the TPC-D benchmark database generator dbgen to create test databases. We created a 0.1 scale database, selected the attributes from the tables that appear in the datacube (or are necessary to compute a join), and joined resulting tables to form a single table (we use "Extended Price" as the aggregated value). The tables contain 600,000 tuples.

Our test table has three dimensions (Customer, Supplier, Time). The Customer dimension is a 2 attribute hierarchy (Customer.nation, Customer.customer_id), while Time is a three attribute hierarchy (Time.year, Time.month, Time.day). Since there only 12 months in a year and at most 31 days in a month, the Time dimension can be pruned. We experimented with three hierarchical split cube forests for this data cube, shown in FIGS. 12(a)–(b). Spine edges are solid, and non-spine edges are dashed. In the first h-split forest, we do not prune any template nodes. For the second h-split forest we prune Time.month, and in the third forest we prune Time.month and Time.year.

Figure 12B:
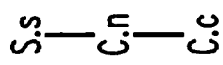
Figure 12A:
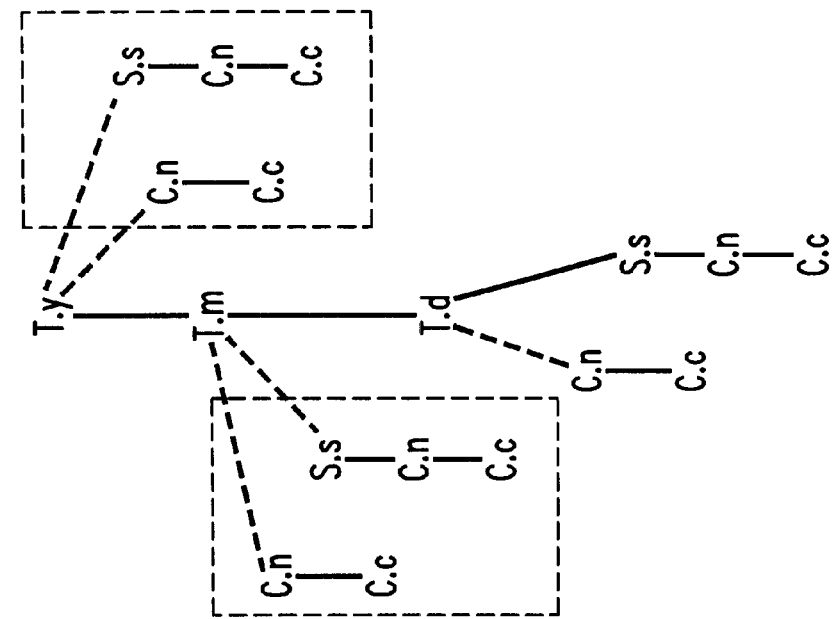

FIGS. 12(a)–(b) depict an H-split forest for the (Customer, Supplier, Time) cube (the TSC forest).

We built test forests by inserting tuples from the test database into an empty forest using the batch update algorithm. We used 1K byte pages, and 30 buffers managed by LRU. We chose the small buffer size because a large buffer would mask the volume of I/O calls requested by the algorithm.

7.1.1 Comparison with Our Cost Model

Building the unpruned (Customer, Supplier, Time) index required 960 thousand I/Os with a batch size of 10,000 tuples (400 thousand I/Os with a batch size of 100,000 tuples), and occupied 62 Mbytes of storage. When the Time.month template node is pruned, 800 thousand (250 thousand) I/Os and 43 Mbytes of storage are required and when both Time.year and Time.month are pruned, only 560 thousand (110 thousand) I/Os and 30 Mbytes are required.

The relative performance of the three forests fits our model of batch updates. In the (Customer, Supplier, Time) database, there are 10,000 unique customers. So, every root-to-leaf path in the template corresponds to 10,000 root-to-leaf paths in the index during a batch update. The number of root-to-leaf paths in the three forests is 8, 6, and 4, which are roughly proportional to the number of I/Os required to build the forest when a batch size of 10,000 is used (960 thousand, 800 thousand, 560 thousand). There are 7 unique years, and 1,000 unique suppliers. When a batch size of 100,000 tuples is used, then all root-to-leaf paths in the template except for one (C.n-C.c) correspond to about 100,000 root-to-leaf paths in the index during a batch update. Our model of batch updates indicates that the proportion of the number of I/Os required to build the three forests should be in the proportion 7:5:3, which agrees with the observed proportion 40:25:11.

We asked eight queries of the three forests. The queries and the number of I/Os required to compute an answer are shown in Table 1 (we show the predicate in the where clause of the query). For all but the last two queries, only a few I/Os are required. The fifth query selects the year and the month of the tuples to be aggregated. For the two forests where Time.month is pruned, answering the query requires a scan over all possible days in a month. Our model of query performance predicts a 31-fold increase in the number of I/Os required if Time.month is pruned. Our results show a 14-fold increase in the number of I/Os (from 6 to 84 or 85). The actual results are better than the predicted results because the search algorithm re-uses paths whereas our model ignores reuse. The sixth query selects on the year but not the month. Our cost model predicts that the forest in which both Time.year and Time.month are pruned requires a 12-fold increase in the number of I/Os required to answer the query as compared to the fifth query. Our results show an 11-fold increase (our algorithm has run out of paths to reuse). Note that the forest where Time.year and Time.month are pruned has good performance on the first query. Only the subtrees are pruned, not the aggregate values.

TABLE 1

| Predicate in where clause of query | Number of I/Os | | |
|---|---|---|---|
| | full | month pruned | month, year pruned |
| Time.year = 1996 | 2 | 1 | 1 |
| Supplier.supplier_id = 844 | 3 | 3 | 3 |
| Supplier.supplier_id = 22 and Customer.nation = 17 | 2 | 2 | 2 |
| Customer.nation = 11 | 1 | 1 | 1 |
| Customer.nation = 0 and Customer.customer_id = 7948 | 2 | 2 | 2 |
| Time.year = 1996 and Time.month = 9 and Time.day = 4 and Supplier.supplier_id = 44 | 3 | 4 | 7 |
| Time.year = 1993 and Time.month = 5 supplier.supplier_id = 39 and Customer.nation = 6 and Customer.customer_id = 11795 | 5 | 42 | 41 |
| Time.Year = 1998 and Customer.nation = 13 | 2 | 3 | 493 |

What is claimed is:

1. A method for efficiently answering a query for a single aggregate of data stored on a computer and indexed by a cube forest comprising the steps of:
    a) inputting a query, including specifying the type of query by stating how far down a hierarchy a value of an attribute is specified; and
    b) generating a query plan by finding a path in a cube forest template that starts at a root, and includes a node for every attribute value specified in the query;
        wherein the path found in step b) represents the query plan;
        said method further including the step of transforming the path into a query plan that contains detailed instructions for a generic query plan executer;
        said method further including the steps of:
    c) beginning at a top of the path and walking to an end of the path; and
    d) creating, for every node, an entry that specifies what to do at that node, including (dimension, attribute, value, and operation), wherein if the attribute value is specified in the query, the instruction is (dimension, attribute, value, single), otherwise the instruction is (dimension, attribute, *, sum).

2. The method according to claim 1, wherein the step b) of generating the query plan by finding a path further comprises selecting a shortest path if there are more than one path that starts at a root and includes a node for every attribute value specified in the query.

3. The method according to claim 1, wherein the step b) of executing the query plan comprises the substeps of:
    (i) matching a superkey of an index with a maximal segment of the query plan, such that the maximal segment starts with a first key in the index's superkey; and
    (ii) summing, for each effective leaf that matches the values specified by the query plan segment, a result and returning said result, wherein if the query plan segment is a suffix of the query plan, then returning a stored aggregate, else making a recursive search.

4. A method for querying a cube forest for a group-by aggregate comprising the steps of:
    a) specifying a type of query by stating
        (i) how far down a hierarchy a value of an attribute is specified in a query; and
        (ii) specifying how much further down a hierarchy an answer is grouped; and
    b) generating a query plan by finding a path in a cube forest template that starts at a root and includes a node for every attribute specified in the query;
        wherein the path found in step b) represents the query plan;
        said method further including the step of transforming the path into a query plan that contains detailed instructions for a generic query plan executer;
        said method further including the steps of:
    c) beginning at a top of the path and walking to an end of the path; and
    d) creating, for every node, an entry that specifies what to do at that node, including (dimension, attribute, value, and operation), wherein if the attribute is specified in the query, the instruction is (dimension, attribute, value, single), else if the attribute is specified as a grouping attribute, the instruction is (dimension, attribute, *, groupby), otherwise the instruction is (dimension, attribute, *, sum).

5. The method according to claim 4, wherein the step b) of generating the query plan by finding a path further comprises selecting a shortest path if there are more than one path that starts at a root and includes a node for every attribute specified in the query.

6. The method according to claim 4, wherein the step b) of executing the query plan comprises the substeps of:
    (i) matching a superkey of an index with a maximal segment of the query plan, such that the maximal segment starts with a first key in the index's superkey; and
    (ii) summing, for each effective leaf that matches the values specified by the query plan segment, a result and returning said result, wherein if the query plan segment is a suffix of the query plan, then returning a stored aggregate, else making a recursive search.

7. The method according to claim 6, further comprising the step of retrieving values for a group-by query.

8. The method according to claim 7, wherein the step of retrieving values for a group-by query further comprises the step of creating a query plan according to the steps for creating a query plan for a single-value retrieval, except distinguishing between "single" and group-by.

9. The method according to claim 8, further comprising the step of upon reaching a terminal effective leaf, determining which result aggregate the answer should be added to.

10. The method according to claim 4, wherein range queries are performed according to the same steps above, except that high and low values are attached to attribute selections, and a range of the search is extended appropriately.

11. A device for querying a cube forest for a single aggregate comprising:
    a) an input/output device specifying a type of query by stating how far down a hierarchy a value of an attribute is specified; and
    b) a processor coupled to the input/output device and generating a query plan by finding a path in a cube forest template that starts at a root, and includes a node for every attribute specified in the query;
        said processor to generate the query plan by finding a shortest path if there are more than one path that starts at a root and includes a node for every attribute specified in the query, wherein the path found represents the query plan said processor to transform the path into a query plan that contains detailed instructions for a generic query plan executer by:

c) beginning at a top of the path and walking to an end of the path; and d) creating, for every node, an entry that specifies what to do at that node, including (dimension, attribute, value, and operation), wherein if the attribute value is specified in the query, the instruction is (dimension, attribute, value, single), otherwise the instruction is (dimension, attribute, *, sum).

12. The device according to claim 11, wherein the processor executes the query plan by:

a) matching a superkey of an index with a maximal segment of the query plan, such that the maximal segment starts with a first key in the index's superkey; and b) summing, for each effective leaf that matches the values specified by the query plan segment, a result and returning said result, wherein if the query plan segment is a suffix of the query plan, then returning a stored aggregate, else making a recursive search.

13. A device for querying a cube forest for a group-by aggregate comprising:

a) an input/output device specifying a type of query by stating how far down a hierarchy a value of an attribute is specified; and b) a processor generating a query plan by finding a path in a cube forest template that starts at a root and includes a node for every attribute specified in the query, by finding a shortest path, if there are more than one path that starts at a root and includes a node for every attribute specified in the query, wherein the path found represents the query plan, and by transforming the path into a query plan that contains detailed instructions for a generic query plan executer according to the steps of:

(i) beginning at a top of the path and walking to an end of the path; and (ii) creating, for every node, an entry that specifies what to do at that node, including (dimension, attribute, value, and operation), wherein if the attribute is specified in the query, the instruction is (dimension, attribute, value, single), otherwise the instruction is (dimension, attribute, *, sum).

14. The device according to claim 13, wherein the processor executes the query plan according to the steps of:

a) matching a superkey of an index with a maximal segment of the query plan, such that the maximal segment starts with a first key in the index's superkey;

b) summing, for each effective leaf that matches the values specified by the query plan segment, a result and returning said result, wherein if the query plan segment is a suffix of the query plan, then returning a stored aggregate, else making a recursive search;

c) retrieving values for a group-by query by creating a query plan according to the steps for creating a query plan for a single-value retrieval, except distinguishing between "single" and group-by; and d) upon reaching a terminal effective leaf, determining which result aggregate an answer should be added to, wherein range queries are performed according to the same steps above, except that high and low values are attached to attribute selections, and a range of the search is extended appropriately.

* * * * *